US011741089B1

(12) United States Patent
Porath et al.

(10) Patent No.: US 11,741,089 B1
(45) Date of Patent: Aug. 29, 2023

(54) INTERACTIVE LOCATION QUERIES FOR RAW MACHINE DATA

(71) Applicant: Splunk Inc., San Francisco, CA (US)

(72) Inventors: Michael Porath, San Francisco, CA (US); Siegfried Puchbauer-Schnabel, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/589,661

(22) Filed: Jan. 31, 2022

Related U.S. Application Data

(63) Continuation of application No. 16/455,592, filed on Jun. 27, 2019, now Pat. No. 11,238,033, which is a continuation of application No. 15/011,654, filed on Jan. 31, 2016, now Pat. No. 10,394,802.

(51) Int. Cl.
| | |
|---|---|
| G06F 16/242 | (2019.01) |
| G06F 16/29 | (2019.01) |
| G06F 16/248 | (2019.01) |
| G06F 16/951 | (2019.01) |
| G06F 16/2457 | (2019.01) |
| G06F 3/04842 | (2022.01) |

(52) U.S. Cl.
CPC ...... *G06F 16/2428* (2019.01); *G06F 3/04842* (2013.01); *G06F 16/248* (2019.01); *G06F 16/24578* (2019.01); *G06F 16/29* (2019.01); *G06F 16/951* (2019.01)

(58) Field of Classification Search
CPC ............ G06F 16/2428; G06F 3/04842; G06F 16/24578; G06F 16/248; G06F 16/29; G06F 16/951

USPC .......................................................... 707/725
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,036,541 B2 | 5/2015 | Narkar et al. | |
| 9,130,860 B1 | 9/2015 | Boe et al. | |
| 9,210,056 B1 | 12/2015 | Choudhary et al. | |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Michael Pham
(74) *Attorney, Agent, or Firm* — Knobbe, Martens, Olson & Bear LLP

(57) ABSTRACT

A data intake and query system may store raw machine data that includes location information. A client system may include a user interface for searching the data intake and query system. The user interface allows a user to define a field search query and to define one or more ad-hoc boundary regions on a map. A combined query is transmitted to the data intake and query system, the combined query including both the field search query and location search information that is based on the ad-hoc boundary regions. The data intake and query system runs the combined query and returns responsive results, which are displayed at the client user interface.

20 Claims, 33 Drawing Sheets

(56) References Cited

U.S. PATENT DOCUMENTS

| | | |
|---|---|---|
| 9,215,240 B2 | 12/2015 | Merza et al. |
| 9,286,413 B1 | 3/2016 | Coates et al. |
| 10,127,258 B2 | 11/2018 | Lamas et al. |
| 10,394,802 B1 | 8/2019 | Porath et al. |
| 11,238,033 B1 | 2/2022 | Porath et al. |
| 2002/0199018 A1 | 12/2002 | Diedrich et al. |
| 2007/0143348 A1 | 6/2007 | Rosenberg |
| 2008/0104027 A1 | 5/2008 | Imler et al. |
| 2008/0270366 A1 | 10/2008 | Frank |
| 2010/0332468 A1 | 12/2010 | Cantrell |
| 2013/0073542 A1 | 3/2013 | Zhang et al. |
| 2015/0019537 A1 | 1/2015 | Neels et al. |
| 2015/0112963 A1* | 4/2015 | Mojtahedi ........... G06F 16/9537 707/711 |
| 2015/0120766 A1 | 4/2015 | Hamilton et al. |
| 2015/0341212 A1* | 11/2015 | Hsiao ................... H04L 67/75 715/735 |
| 2016/0019237 A1 | 1/2016 | Dan et al. |
| 2019/0098106 A1 | 3/2019 | Mungel et al. |

OTHER PUBLICATIONS

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Vaid, Workshop on Managing Systems via log Analysis and Machine Learning Techniques (SLAML '10), ;login: vol. 36, No. 1, Oct. 3, 2010, Vancouver, BC, Canada.

\* cited by examiner

FIG. 6B

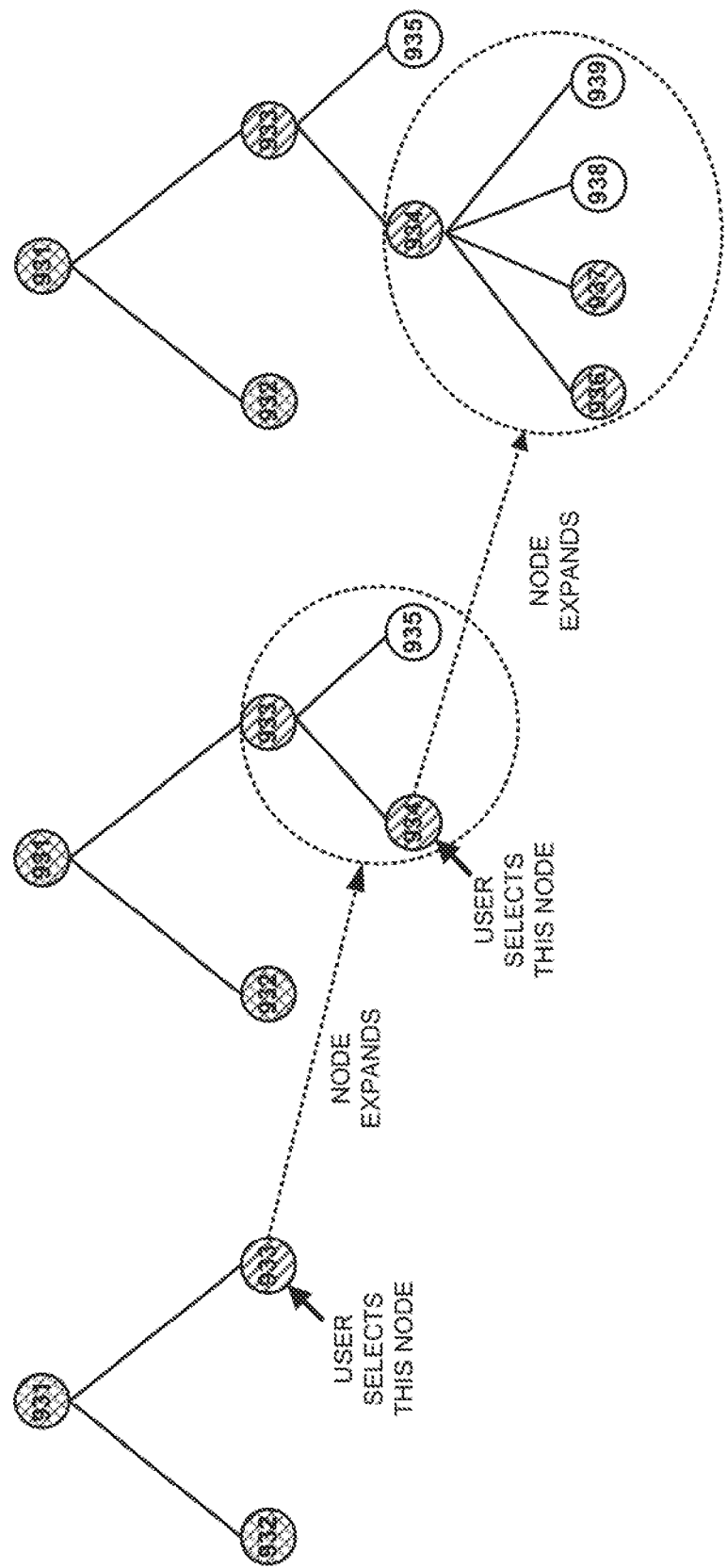

US 11,741,089 B1

INTERACTIVE LOCATION QUERIES FOR RAW MACHINE DATA

BACKGROUND

Information is often classified based on location. Such information may be collected and classified in an intentional manner, with location data and related data stored in a database. Data that is associated with the location information may then be searched based on location. For example, a large business with multiple locations may associate information such as sales or inventory to a particular store location. That may then be searched by store location such that only information for selected store locations is returned in response to the search. Similarly, information may be classified based on geographic locations, including jurisdictional boundaries such as states and cities.

Because such systems only allow certain types of information to be associated with location, only those same limited types of information are searchable by location. Accordingly, such a system may be limited as to the types of information that can be searched, resulting in a limited functionality that is difficult to remedy after the information has already been associated with a location and stored. In addition, the type of location information of the data set may itself be limited, for example, to particular categories such as a store location or jurisdictional boundaries. Thus, the data set may have limited utility outside of its intended application.

BRIEF DESCRIPTION OF THE DRAWINGS

In the drawings:

FIG. 6B illustrates a data summary dialog that enables a user to select various data sources in accordance with the disclosed embodiments;

FIG. 9C illustrates a proactive monitoring tree in accordance with the disclosed embodiments;

DETAILED DESCRIPTION

Figure 1:
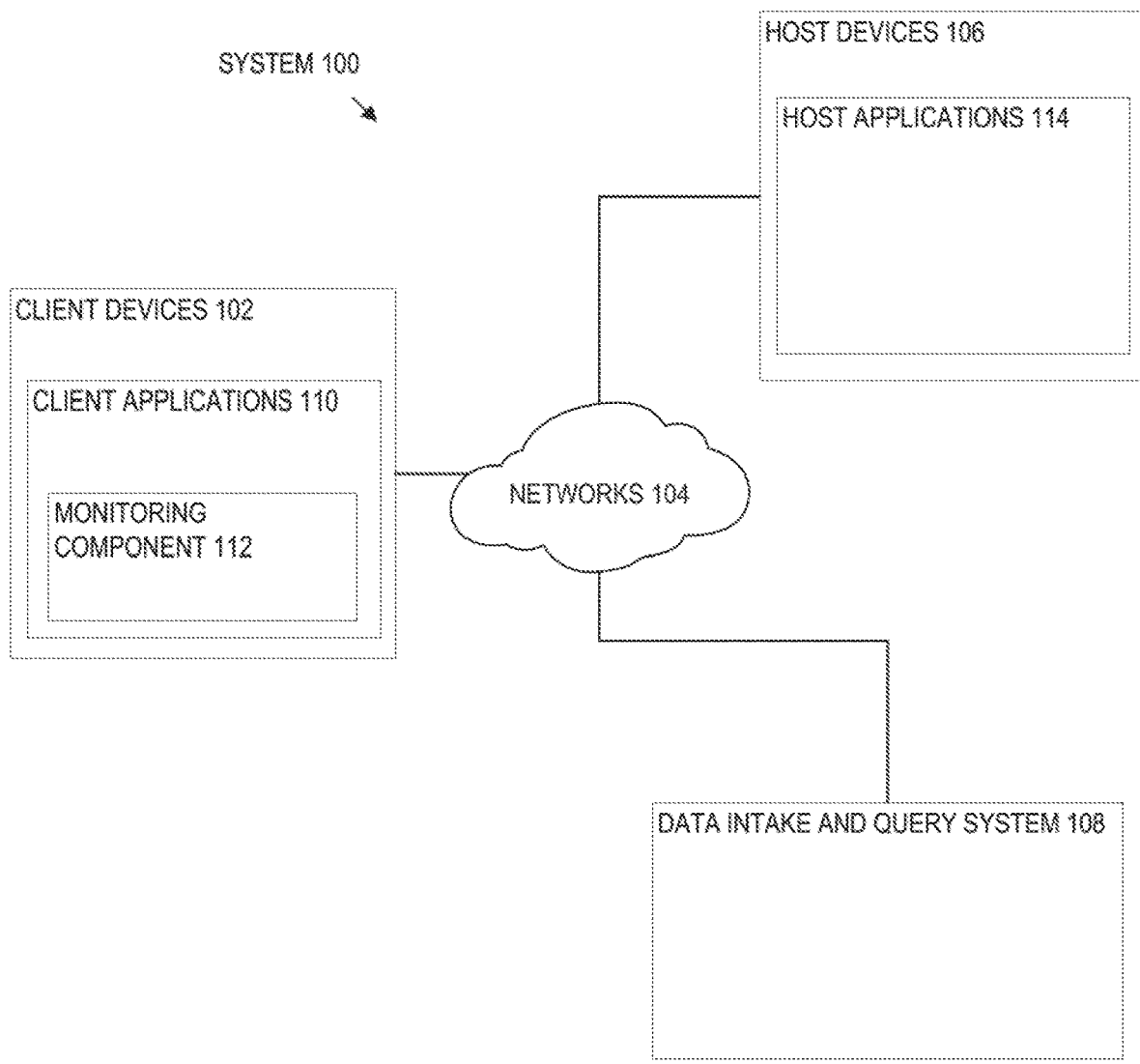
FIG. 1 illustrates a networked computer environment in which an embodiment may be implemented.

A data intake and query system may receive data that includes location information such as geographic information. This information may be provided to the data intake and query system within raw machine data received from a variety of disparate data sources and stored as events. The location information from the disparate data sources may also be provided in a variety of different formats within the events, which may identify location information in different ways. As an example, some events may include location information as coordinates or location relative to a reference point, while some events may include information that may be used to derive a location, such as a name of a town, IP addresses, and a variety of other information types.

An interactive user interface may provide a user with the ability to search events from disparate data sources based on both location information and queries of other fields. A search string may be generated for searching non-location fields of the events, based on user input and selections. An interactive location portion of the user interface may display an interactive map. A variety of tools may be provided that allow the user to generate an overlay for the map, which defines ad-hoc boundary regions. Information about the ad-hoc boundary regions is combined with the search string to provide a combined query.

The data intake and query system receives and processes the combined query. Responsive results are generated from the raw machine data based on both the search string and the locations that fall within the ad-hoc boundary regions. All of the results must meet the requirements of the search sting and the fall within the ad-hoc boundary region. Exemplary results may be events, values from events, and analyses of events and values. The results are returned to the user interface system, which displays results and information about results, such as statistics and visualizations. The visualizations may be provided for the interactive map, which may include a choropleth map depicting information such as the number of results for each ad-hoc boundary region.

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104.

Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
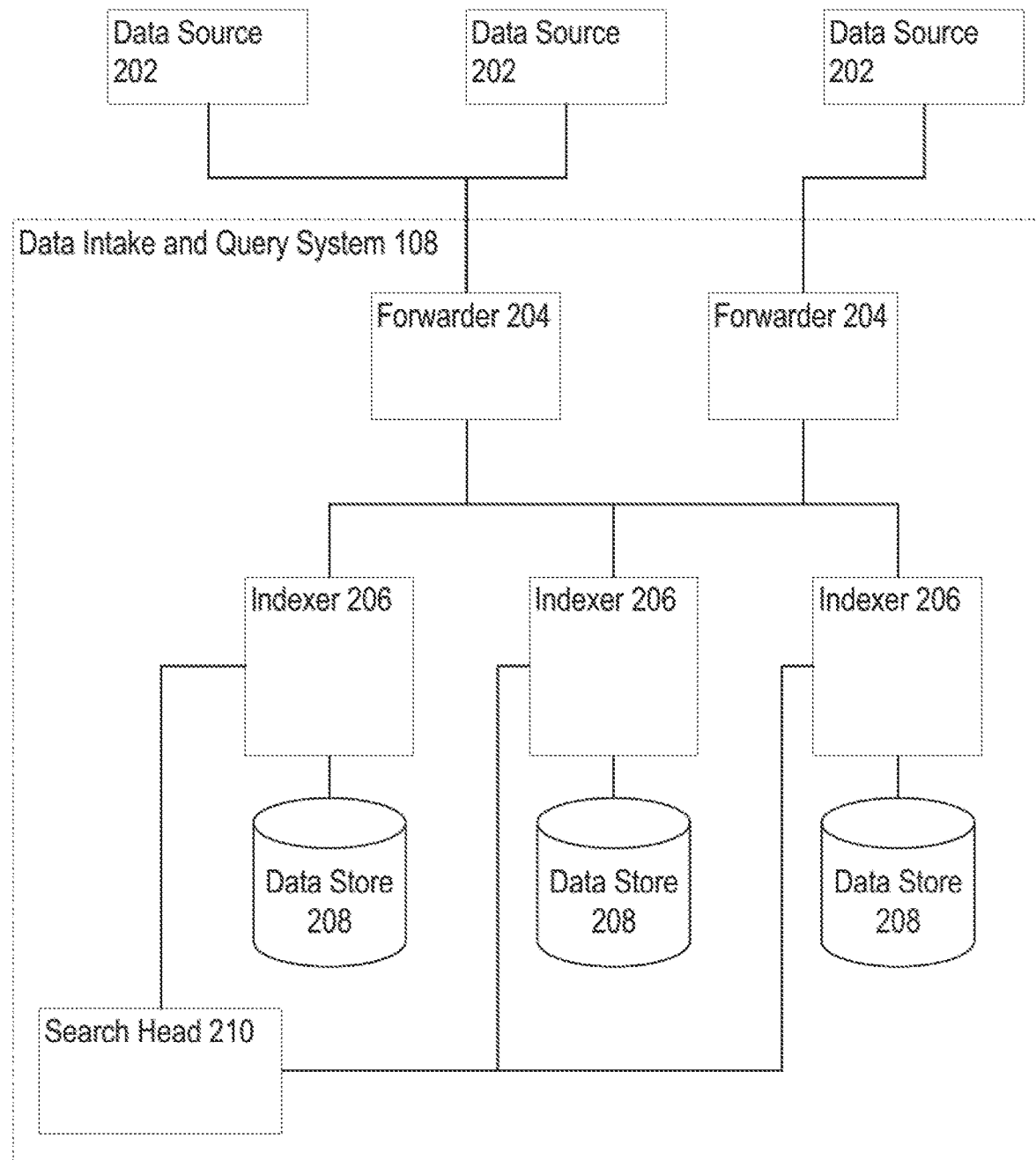
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events.. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
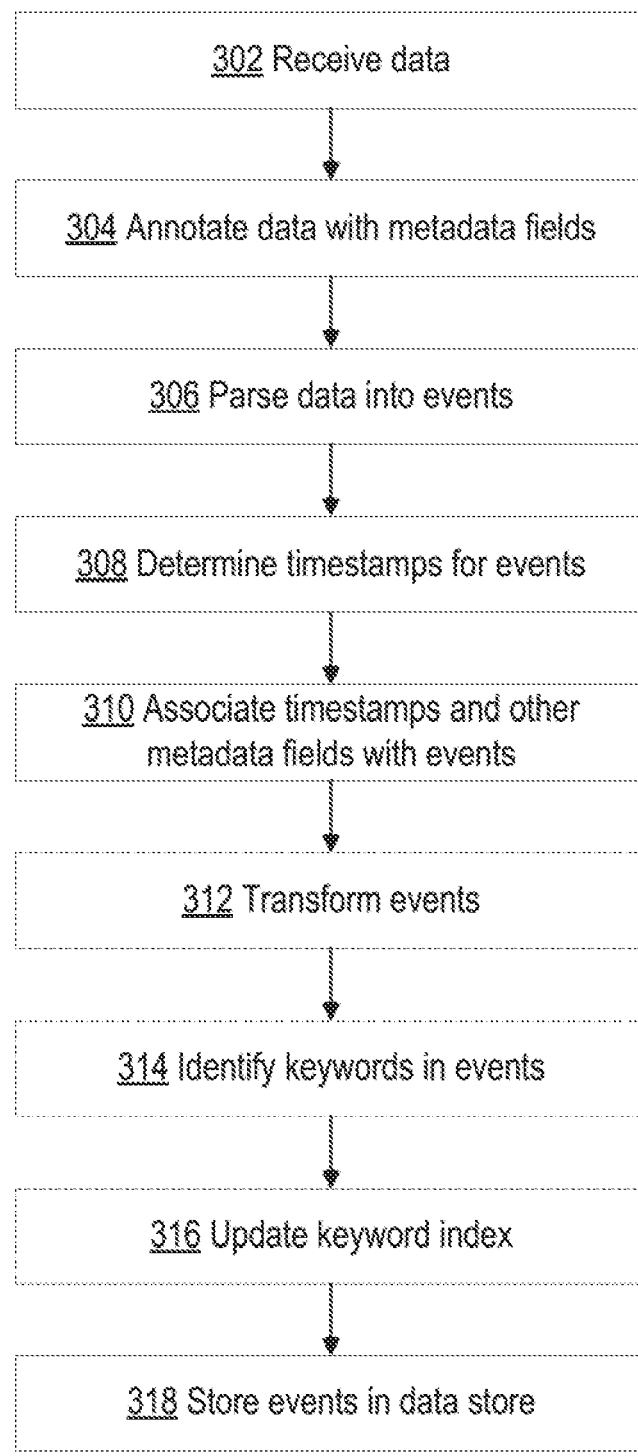
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
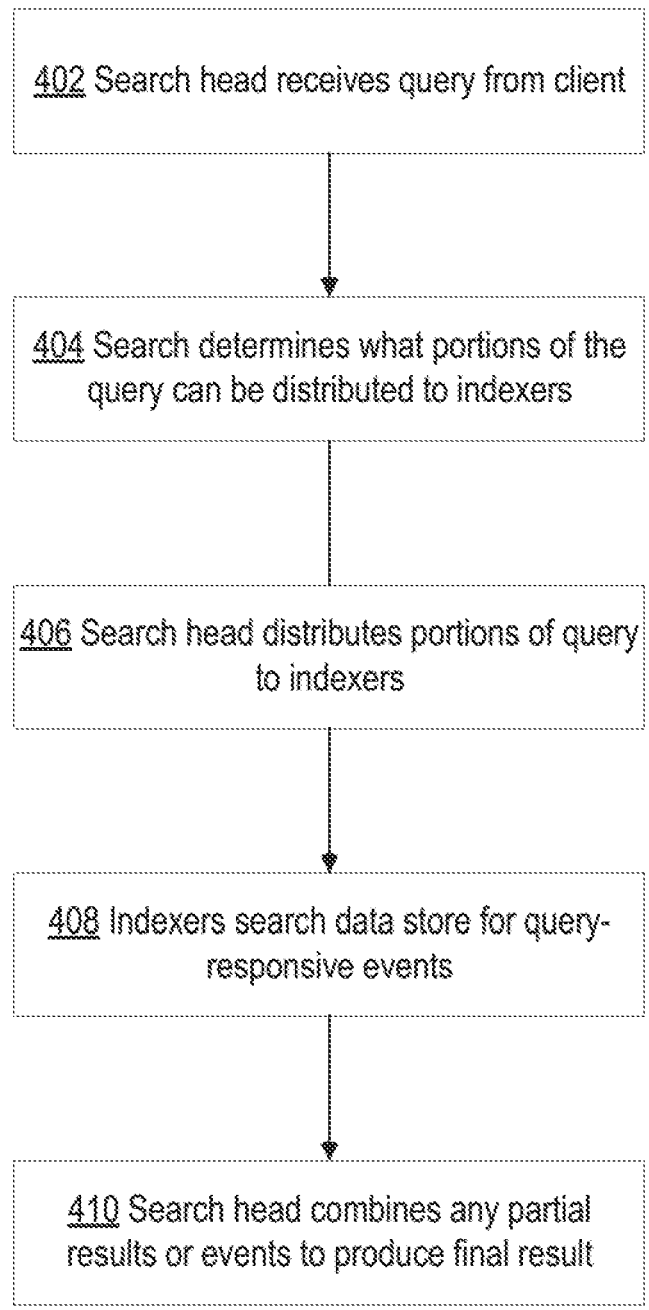
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
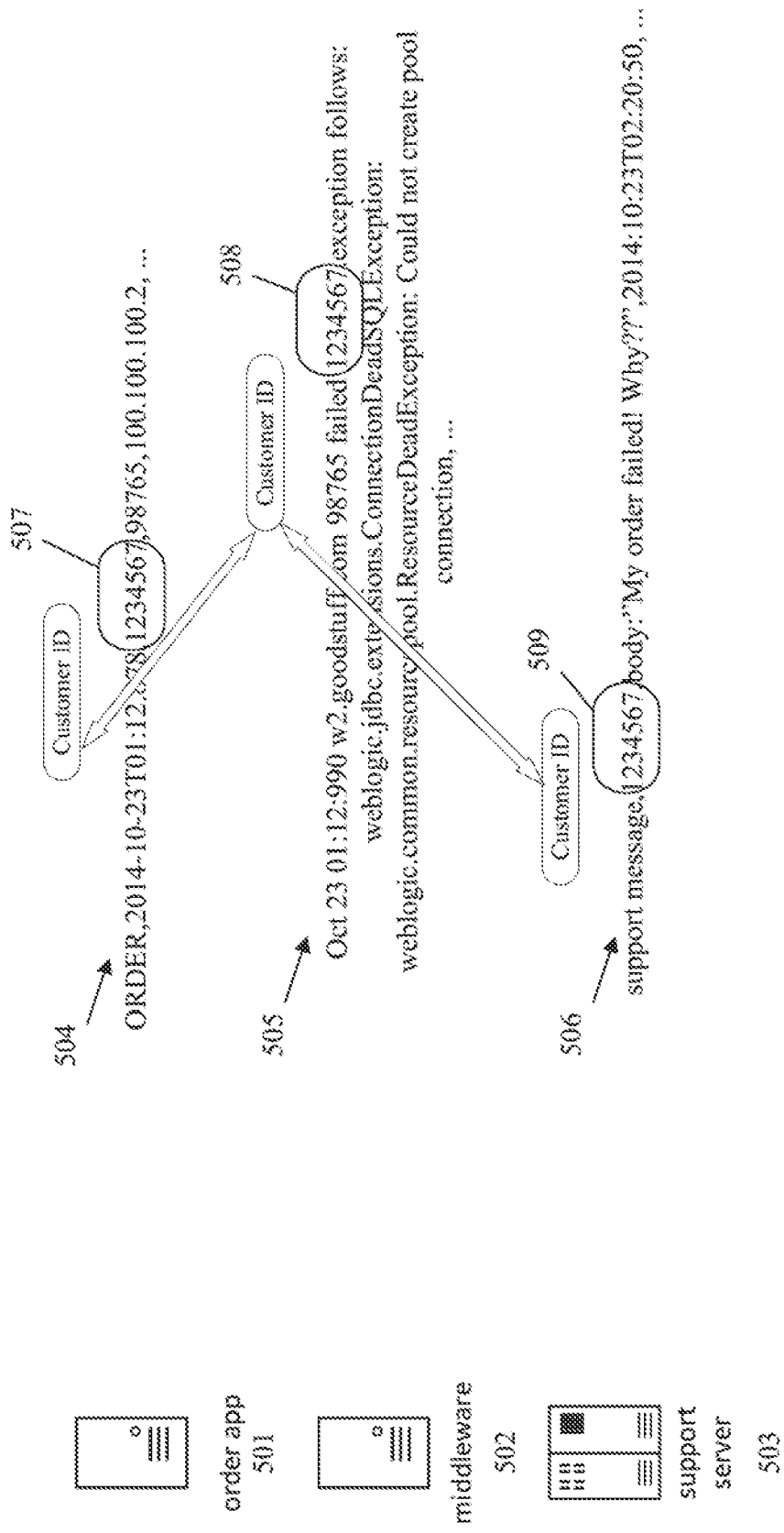
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
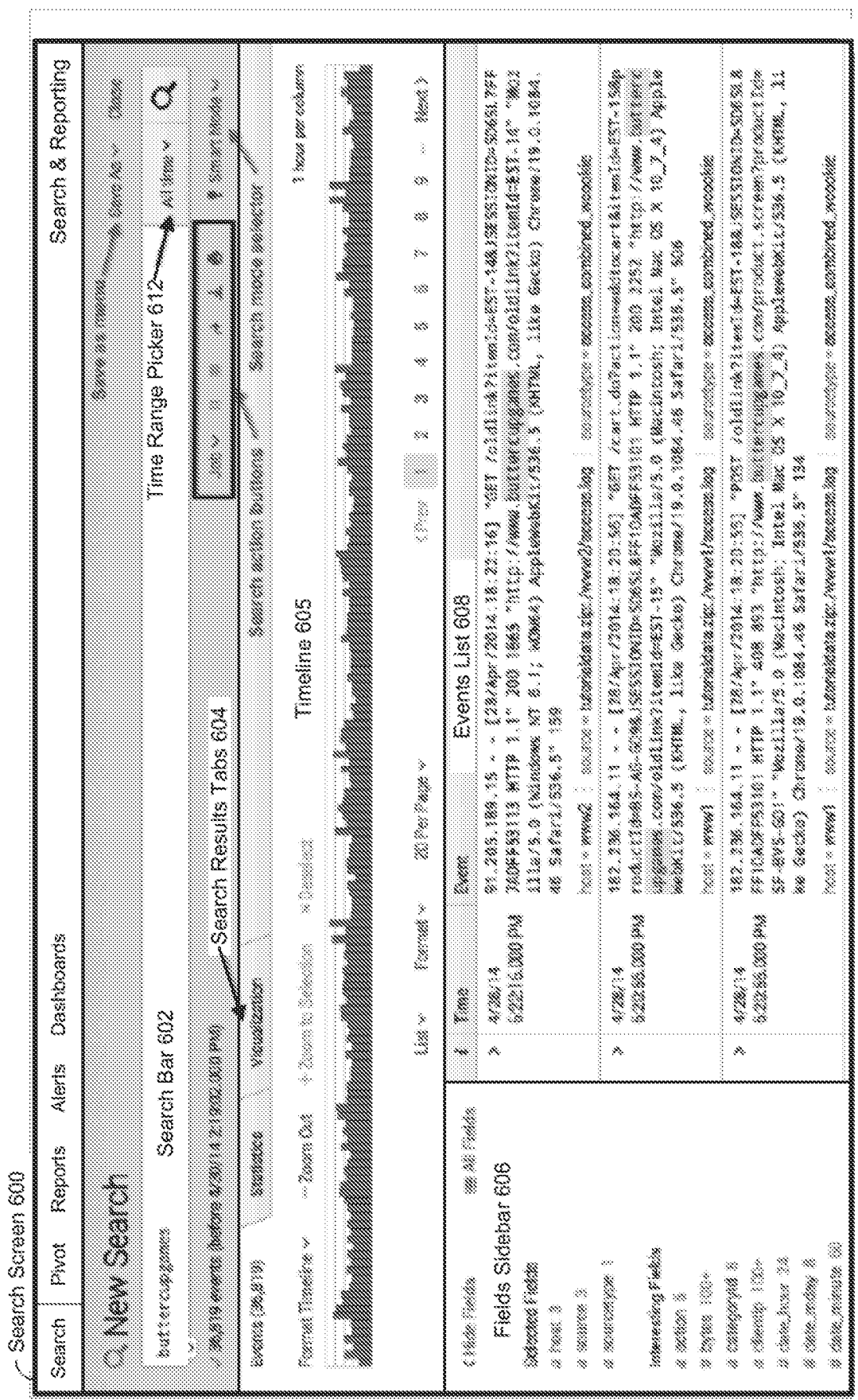
FIG. 6A illustrates a search screen in accordance with the disclosed embodiments.
Figure 6B:
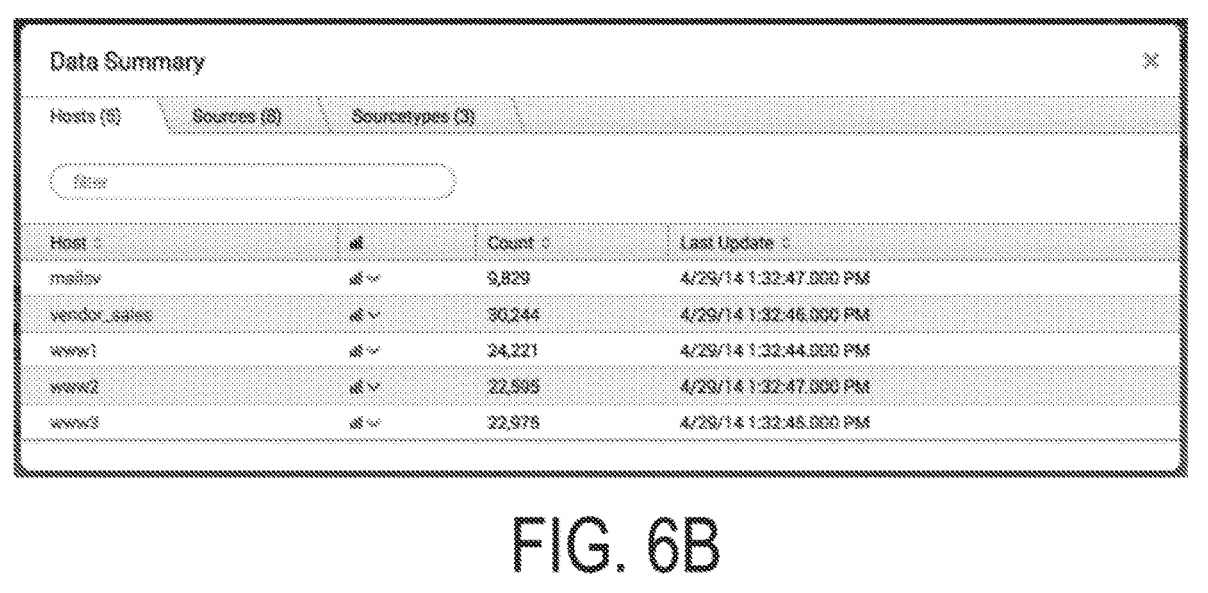

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar., 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
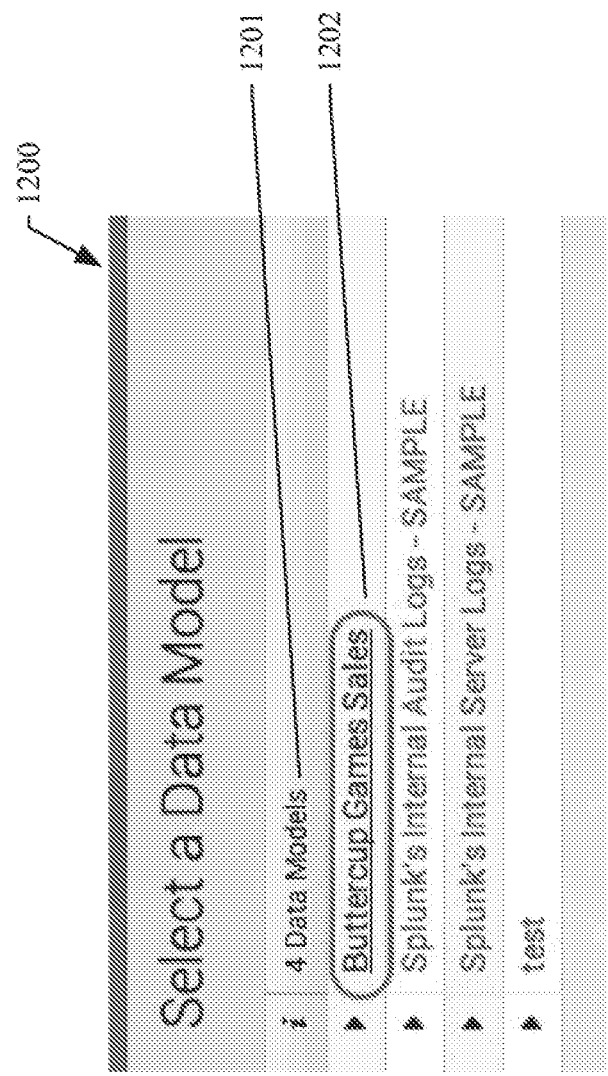
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
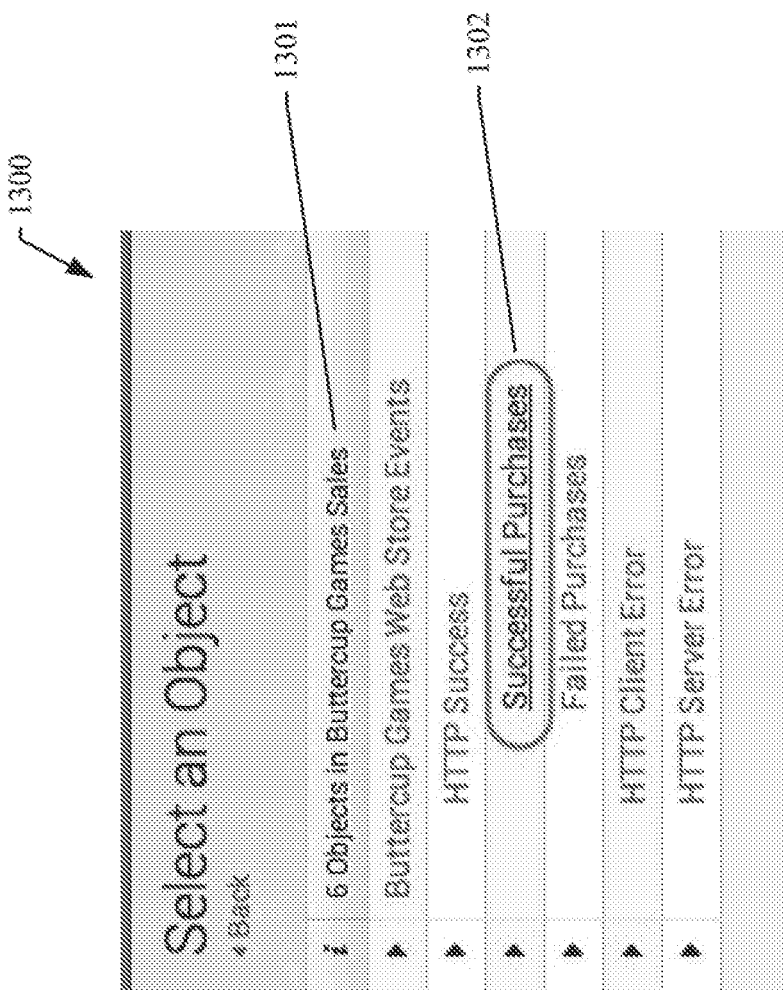

FIG. 13 illustrates an example data model object selection graphical user interface 1300 that displays available data objects 1301 for the selected data object model 1202. The user may select one of the displayed data model objects 1302 for use in driving the report generation process.

Figure 7A:
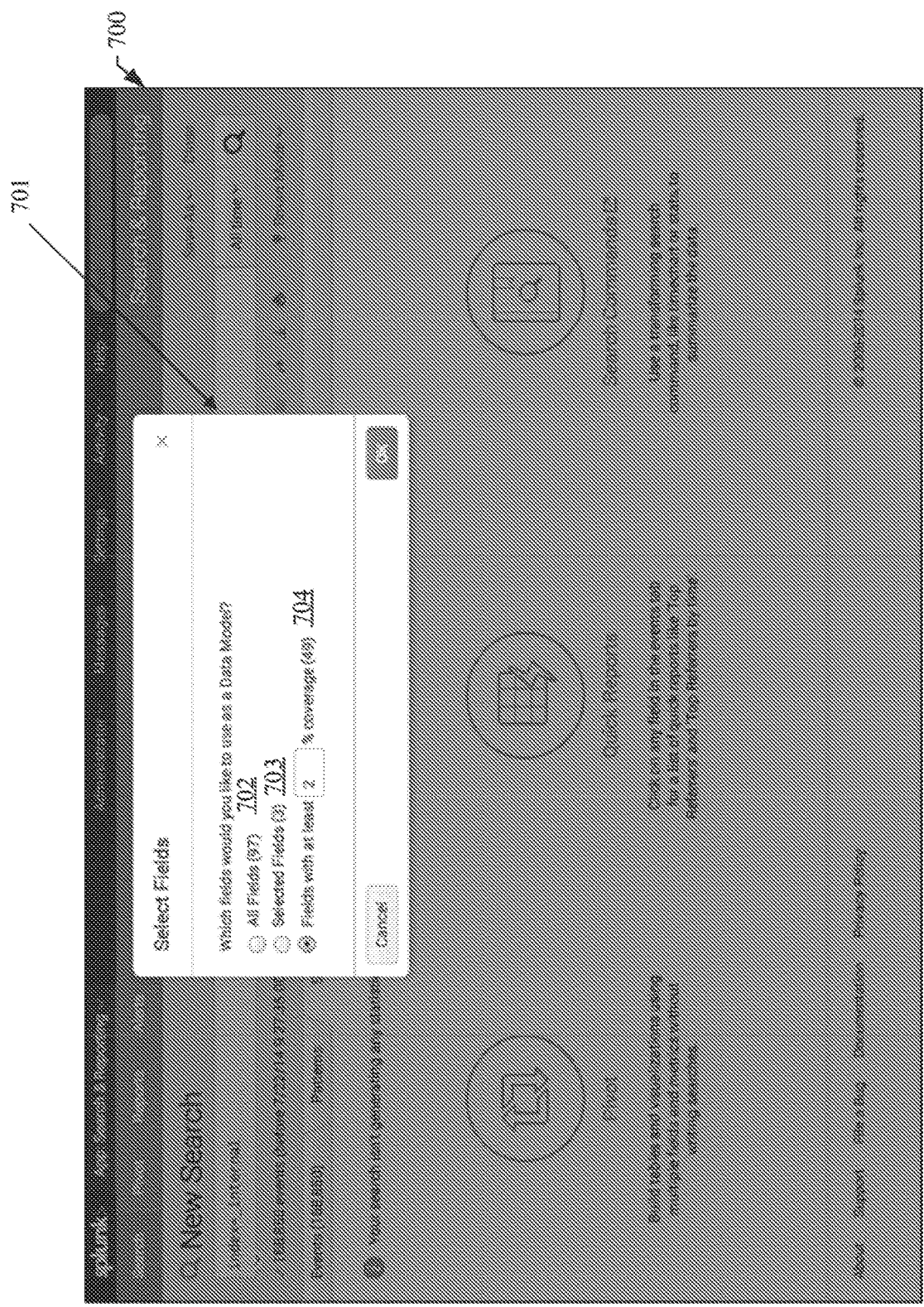
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
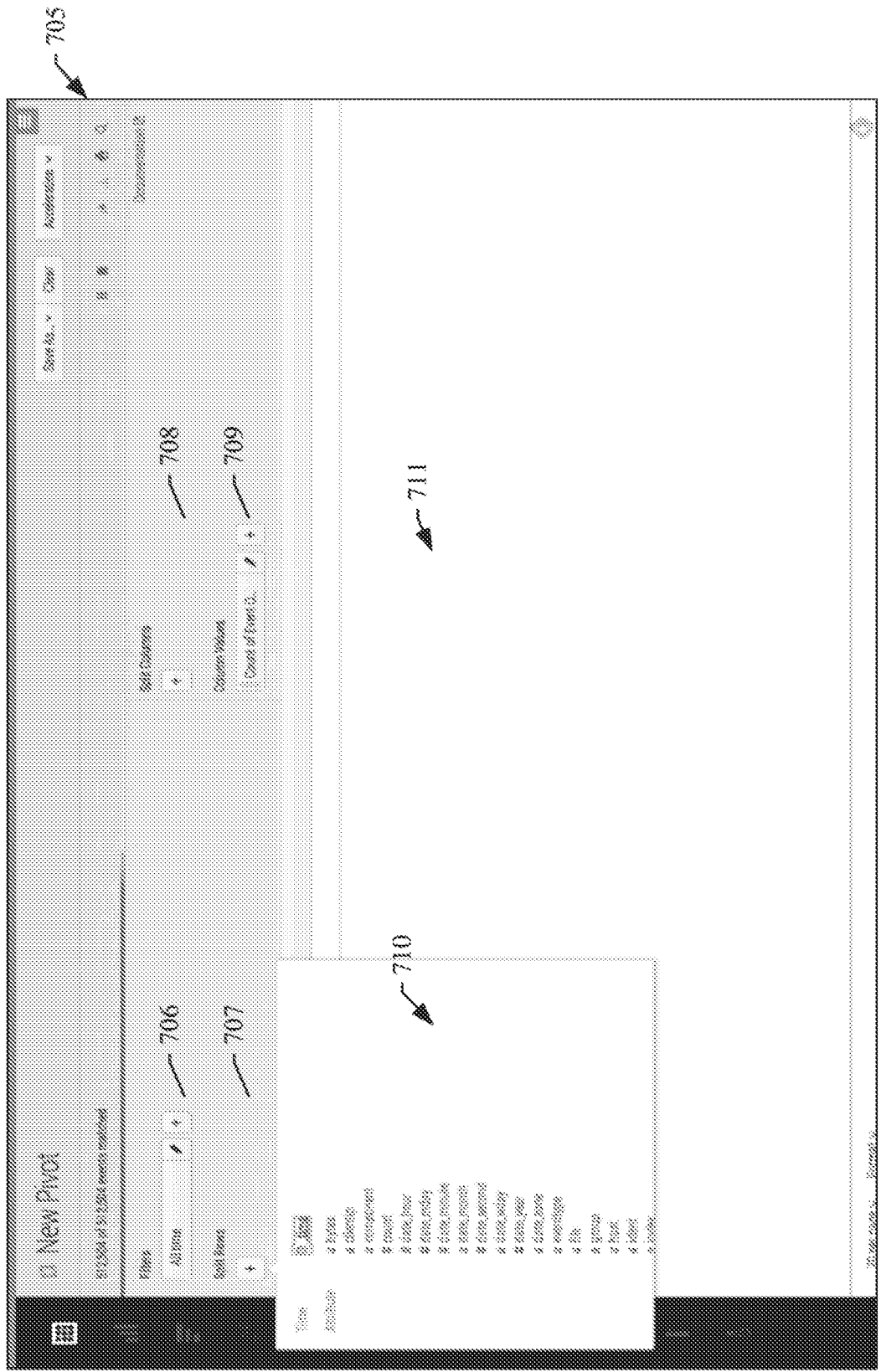
Figure 7C:
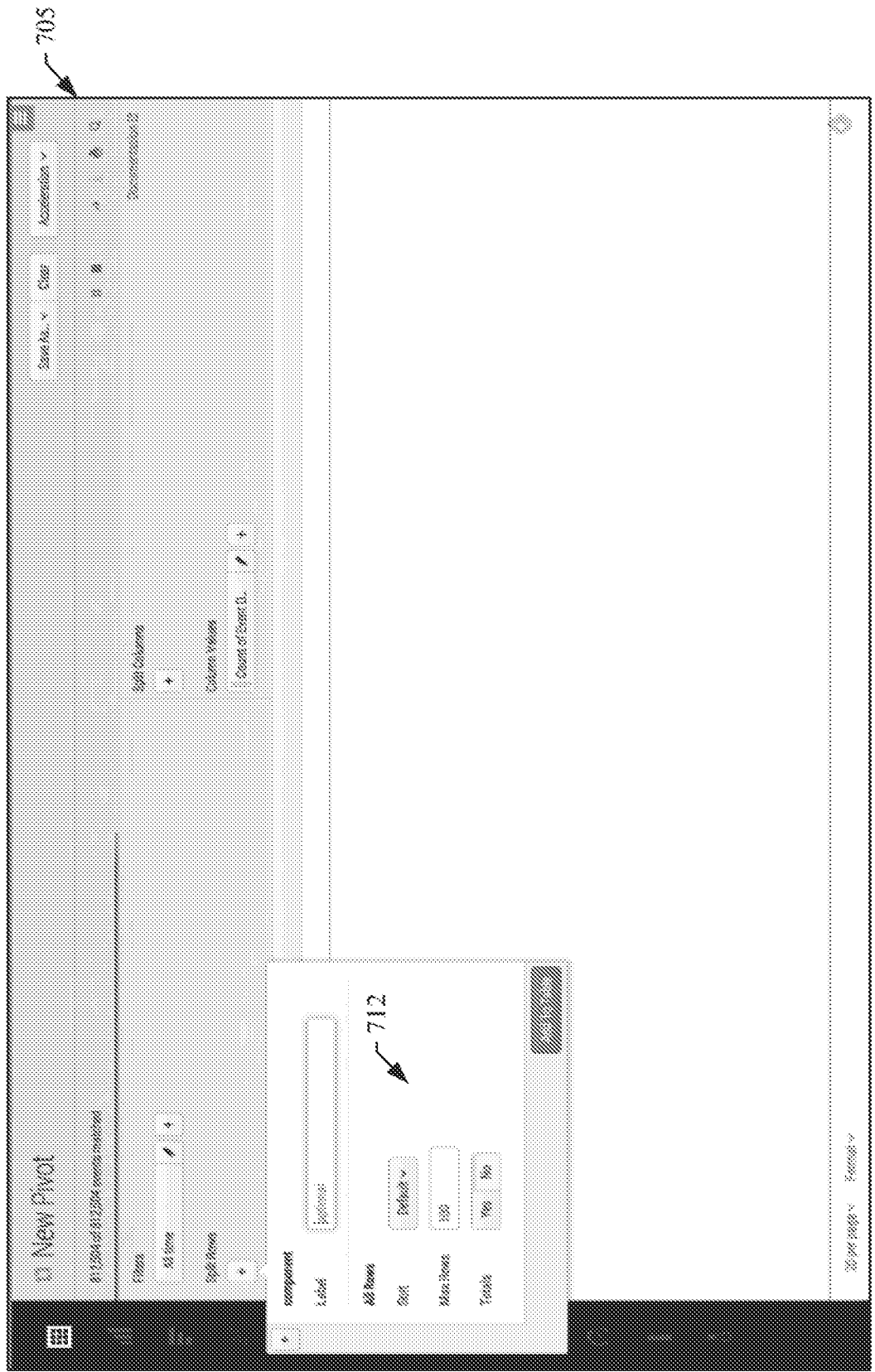

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
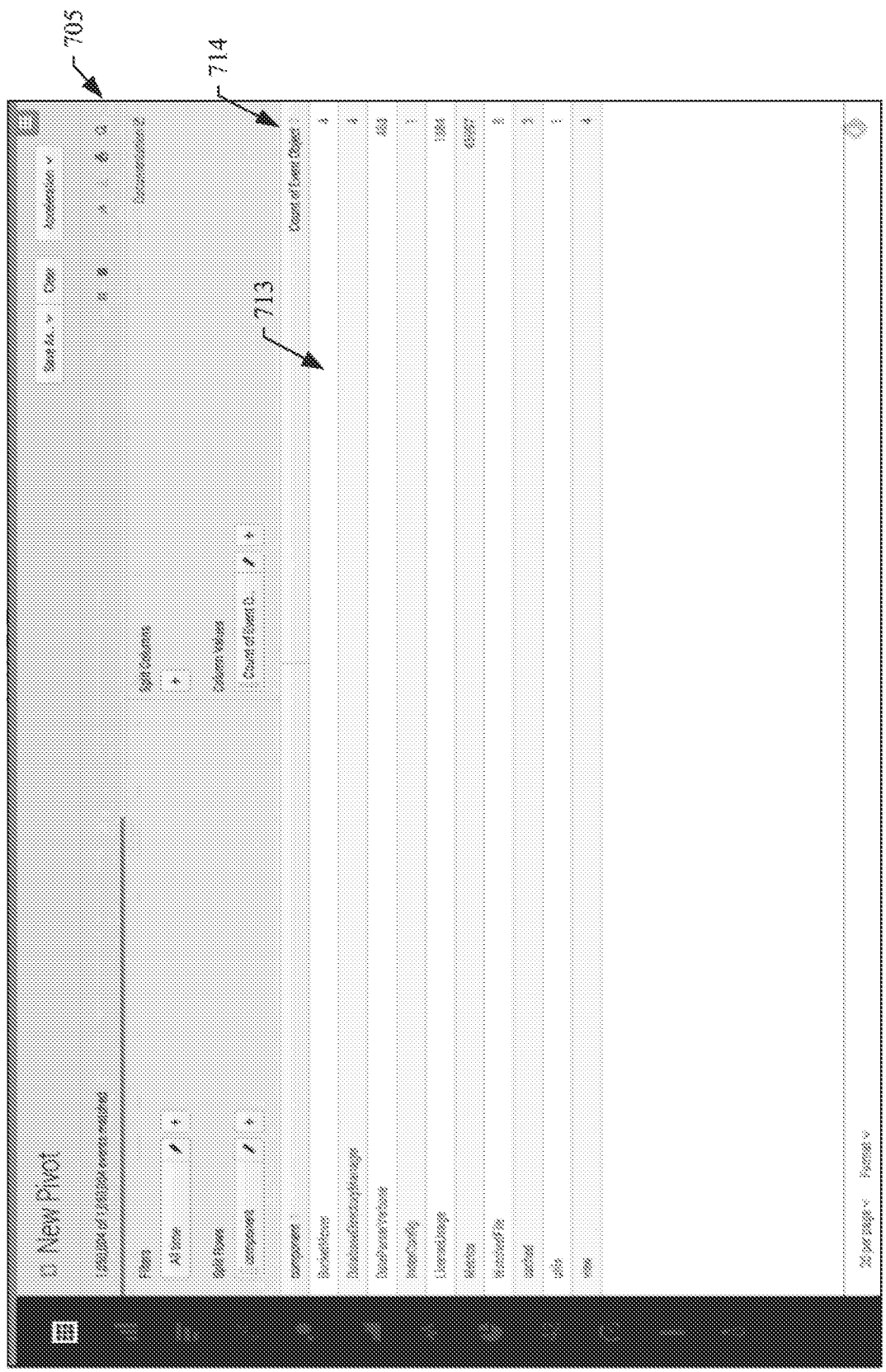

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
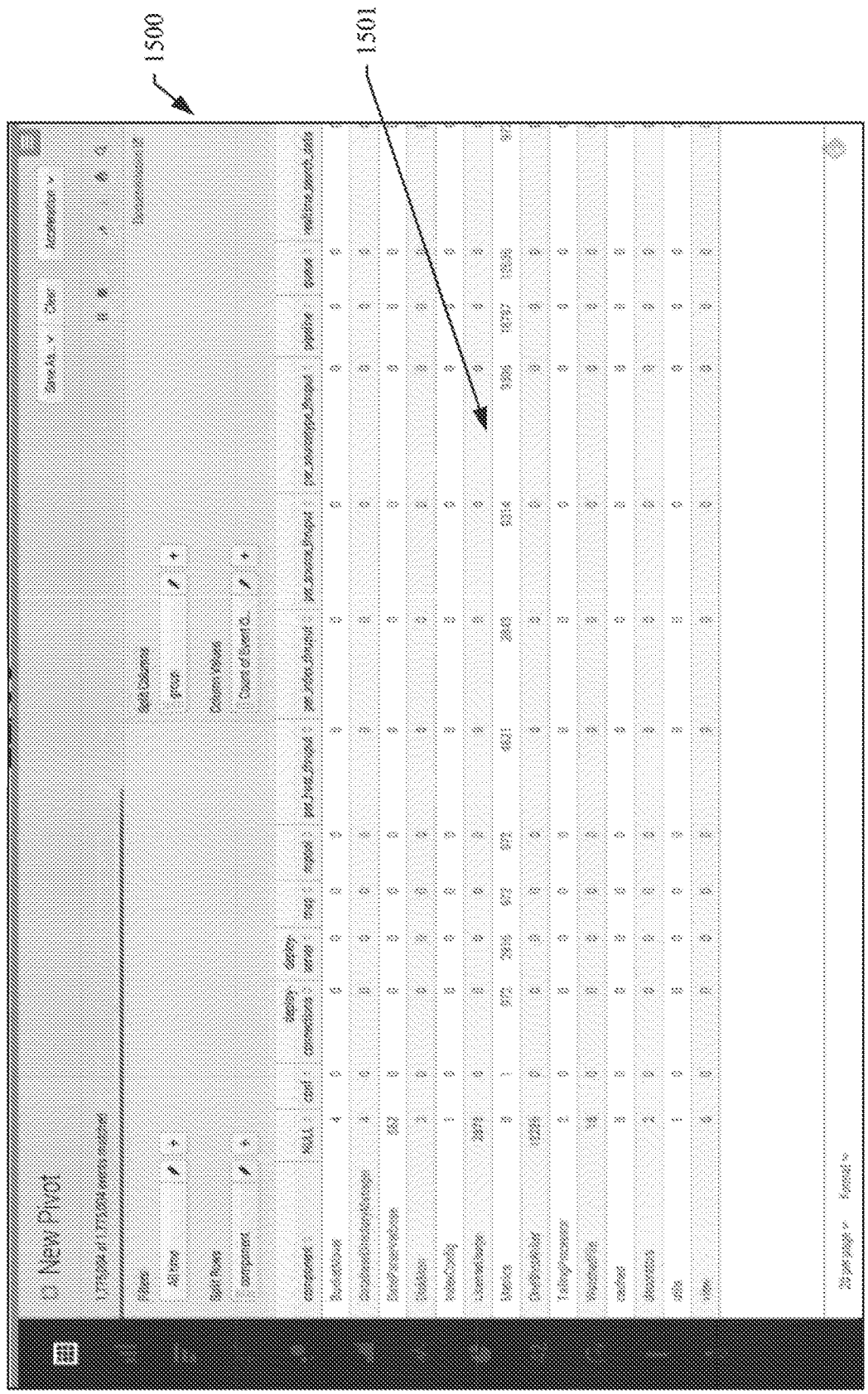
FIGS. 15-17 illustrate example visualizations generated by a reporting application in accordance with the disclosed embodiments.
Figure 16:
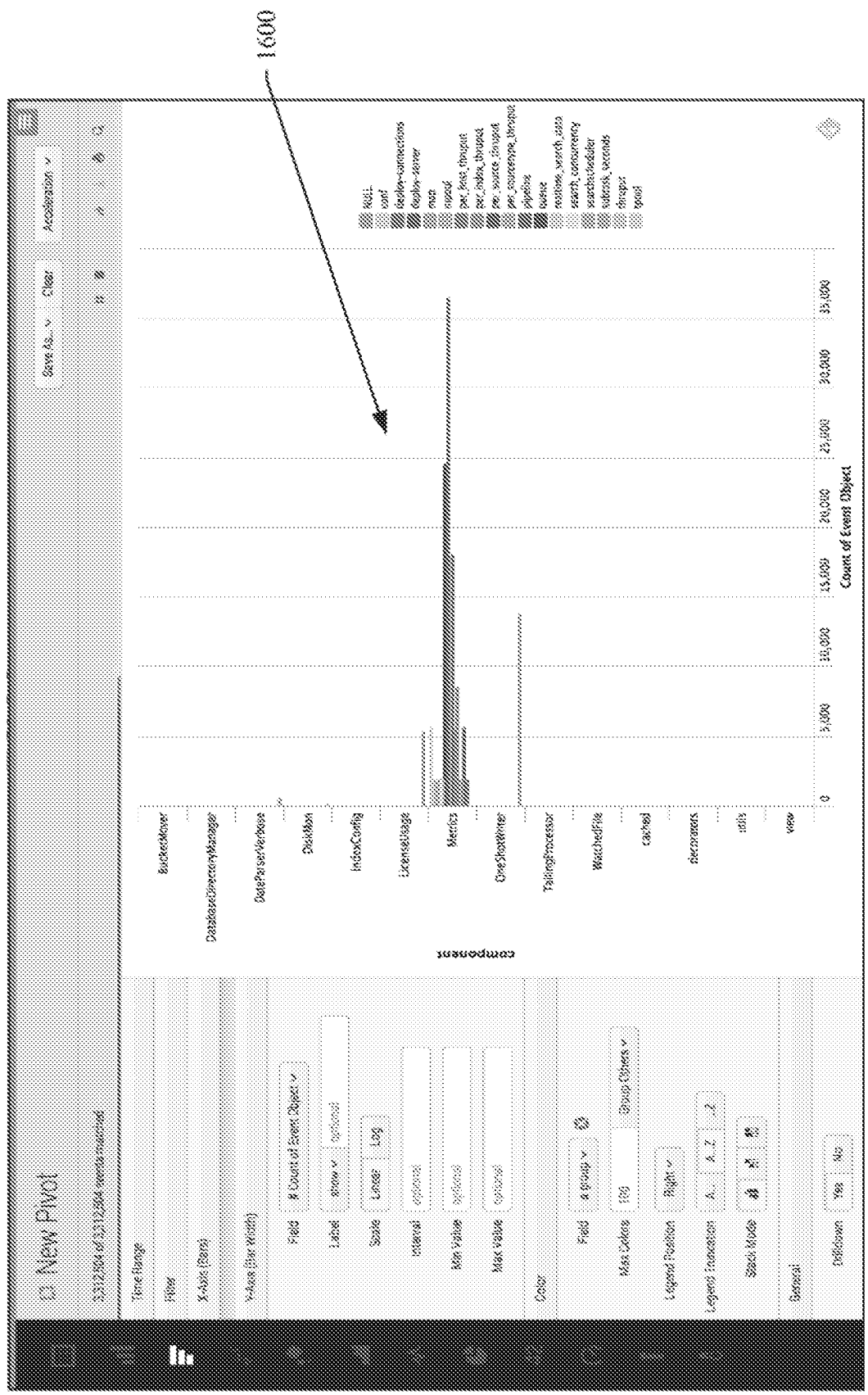
Figure 17:
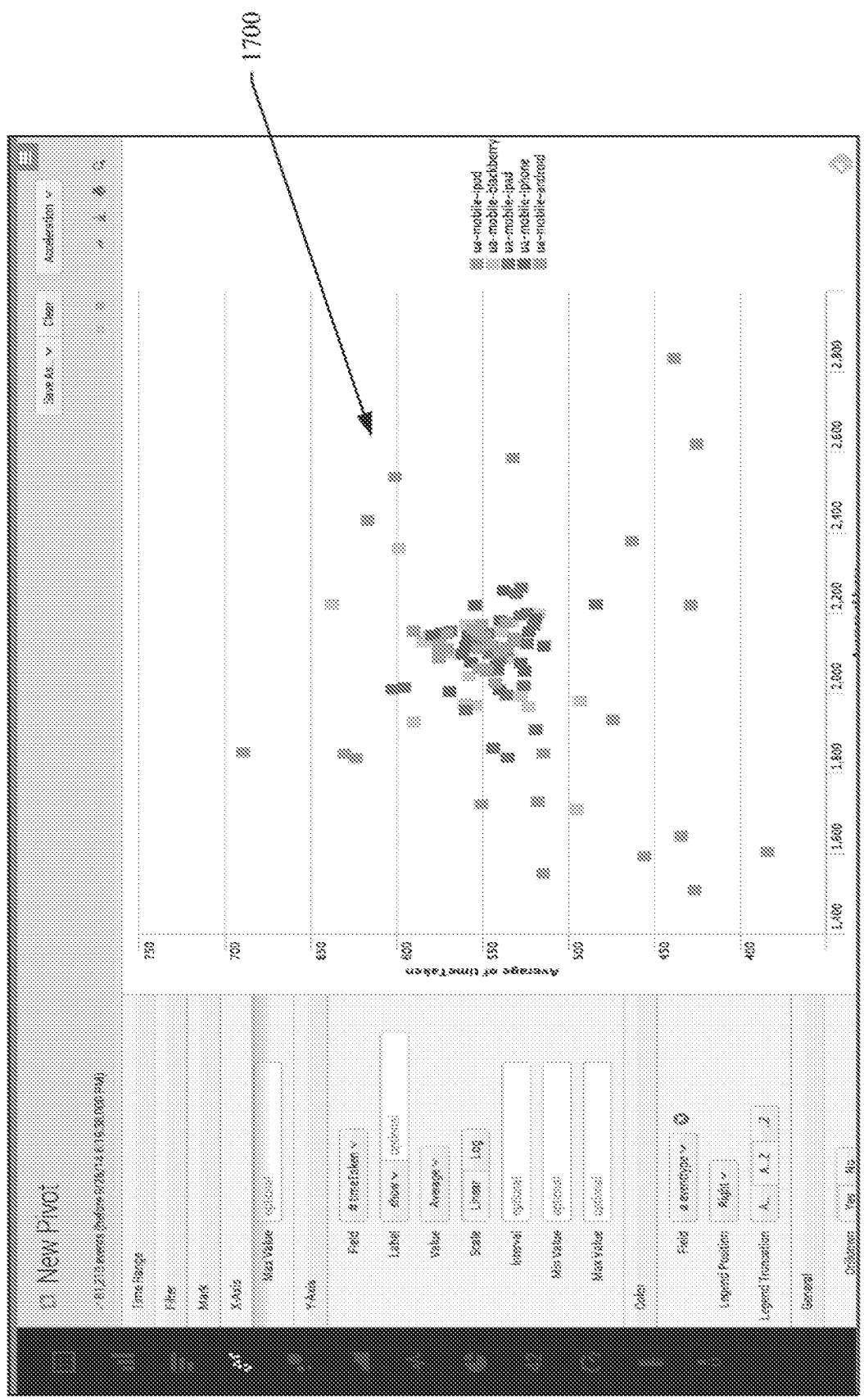

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
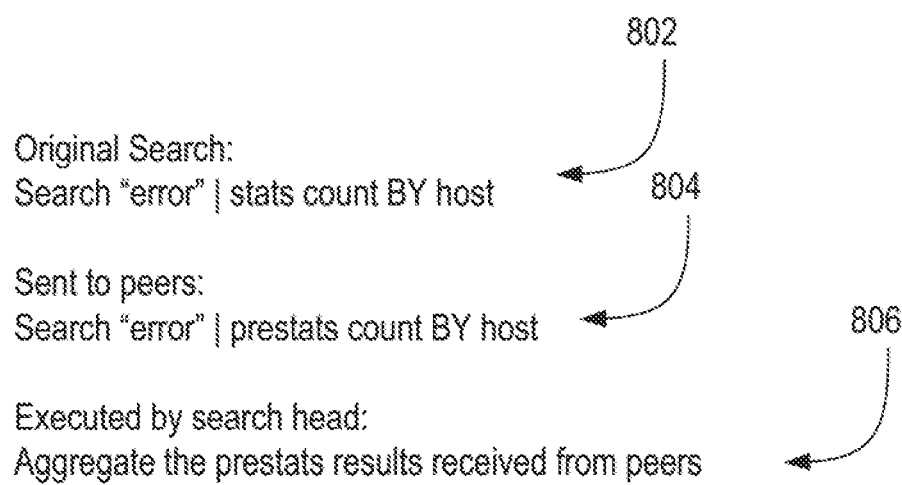
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
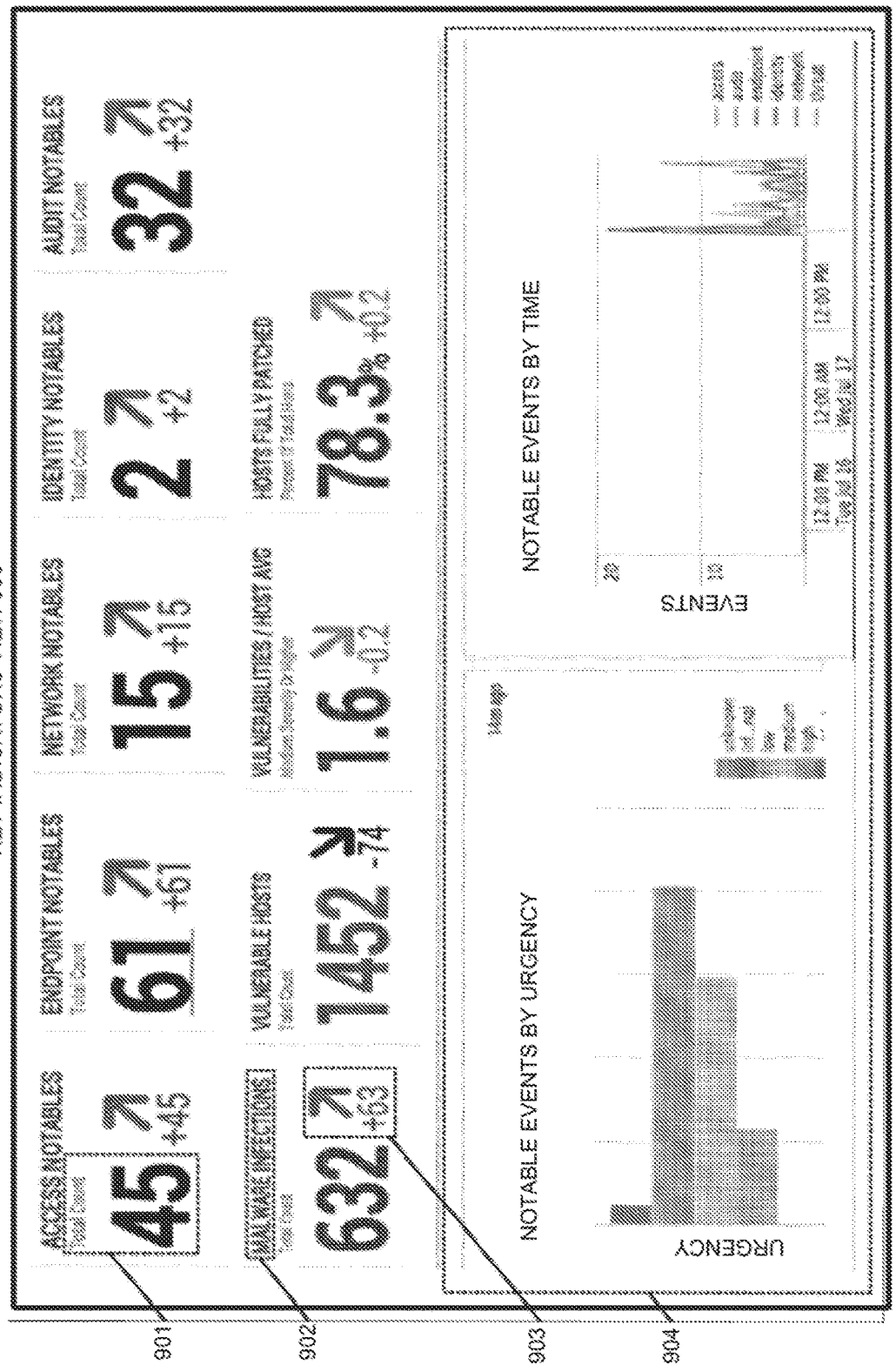
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
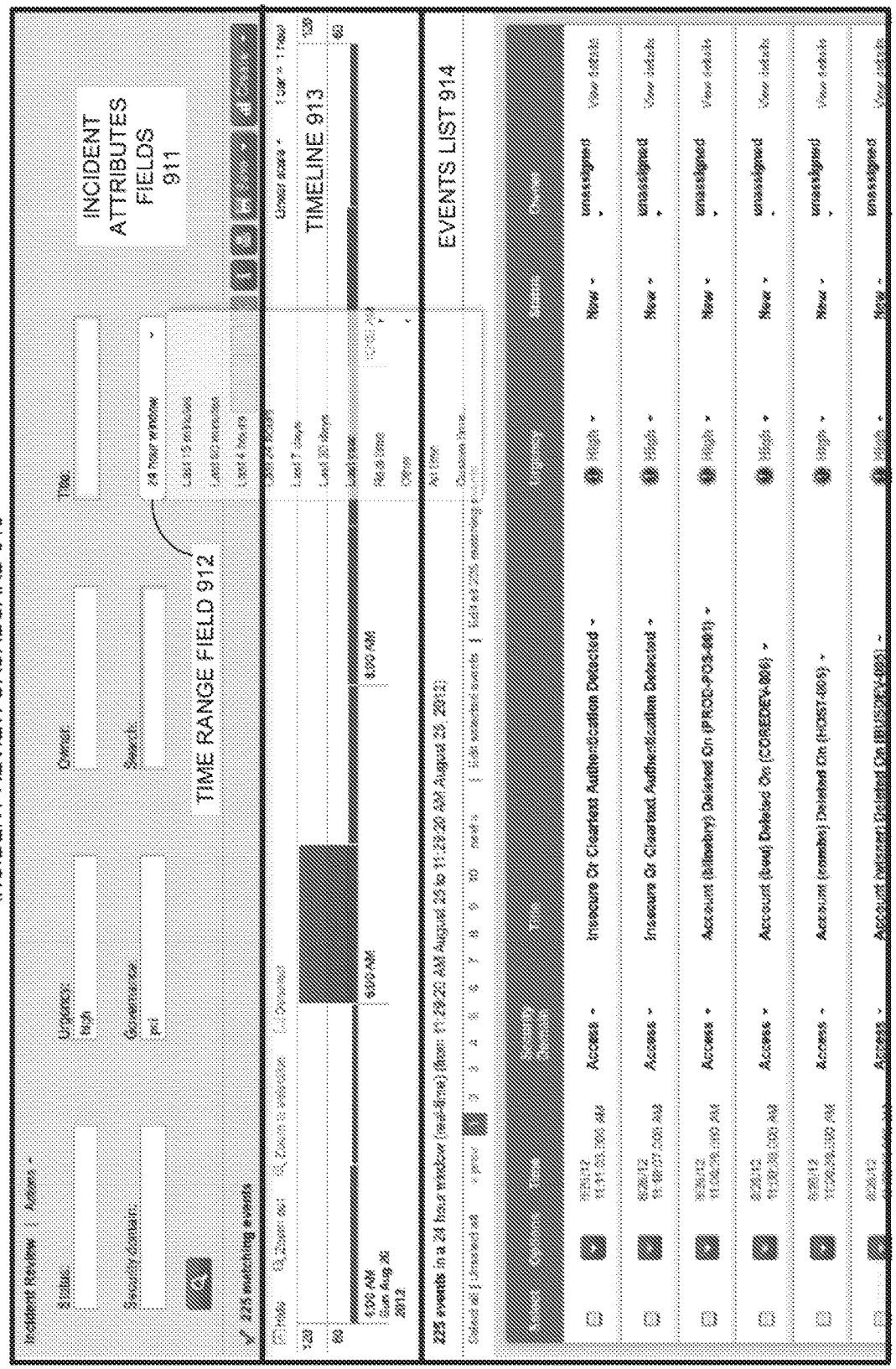
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
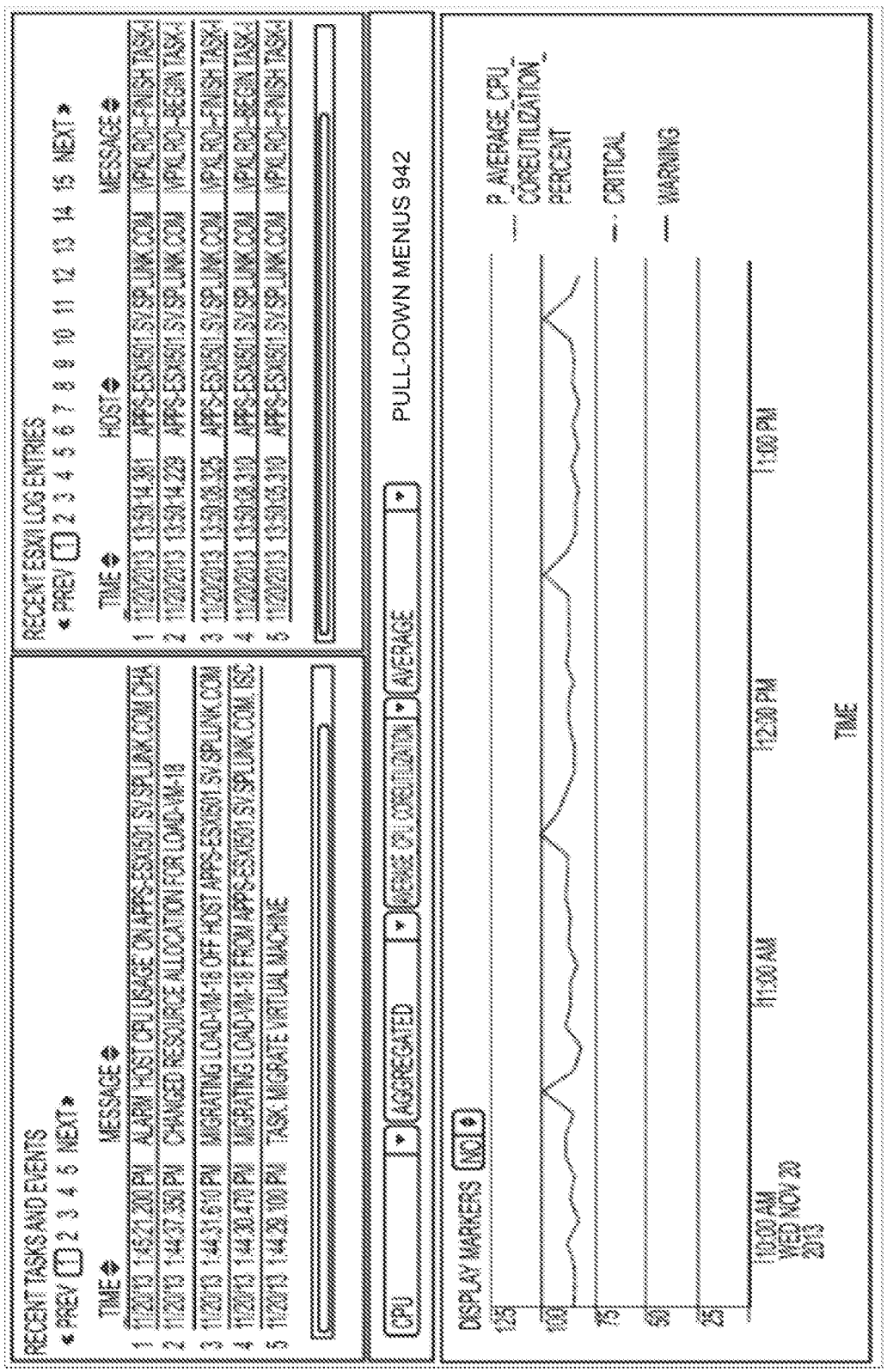
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
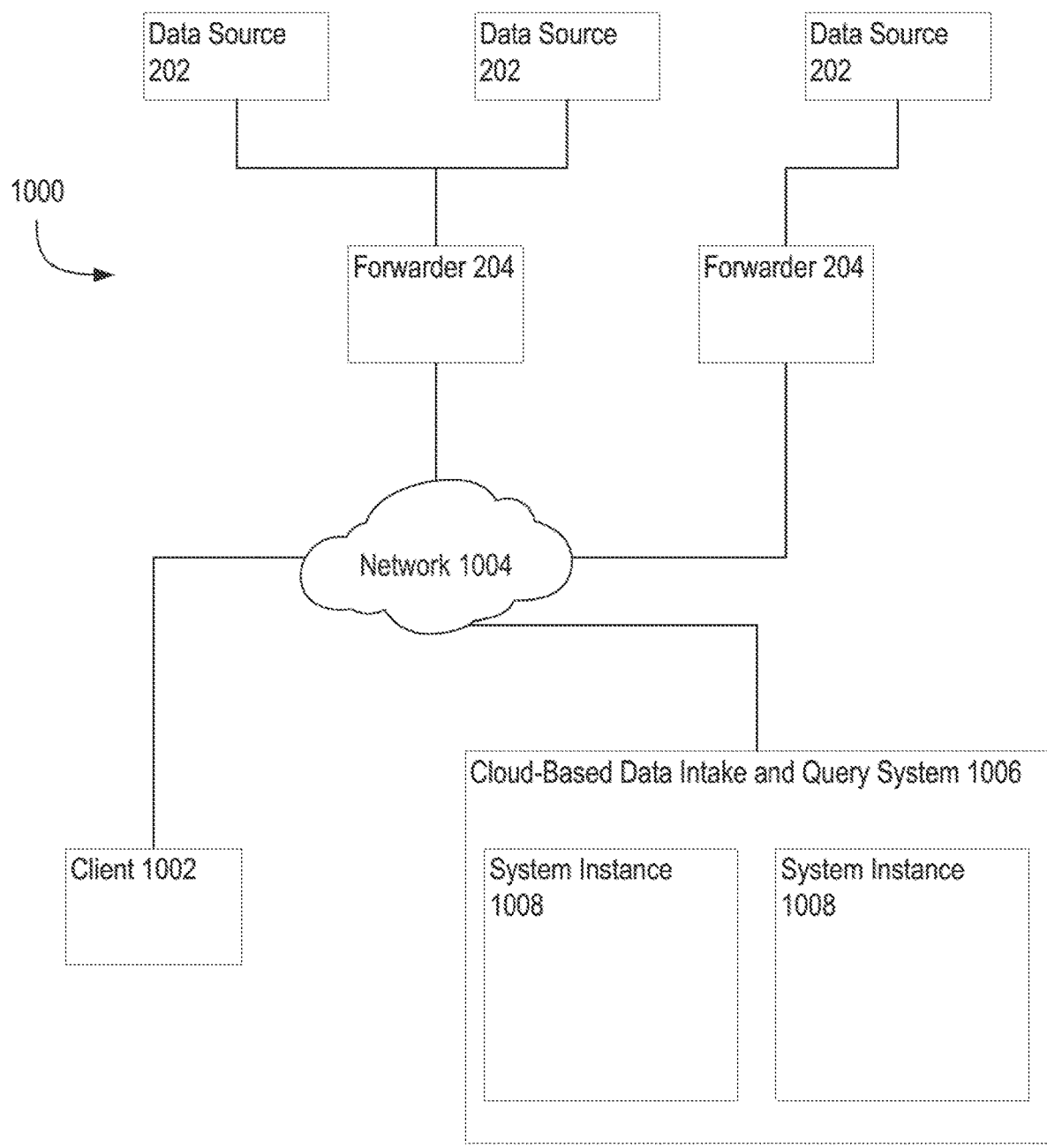
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
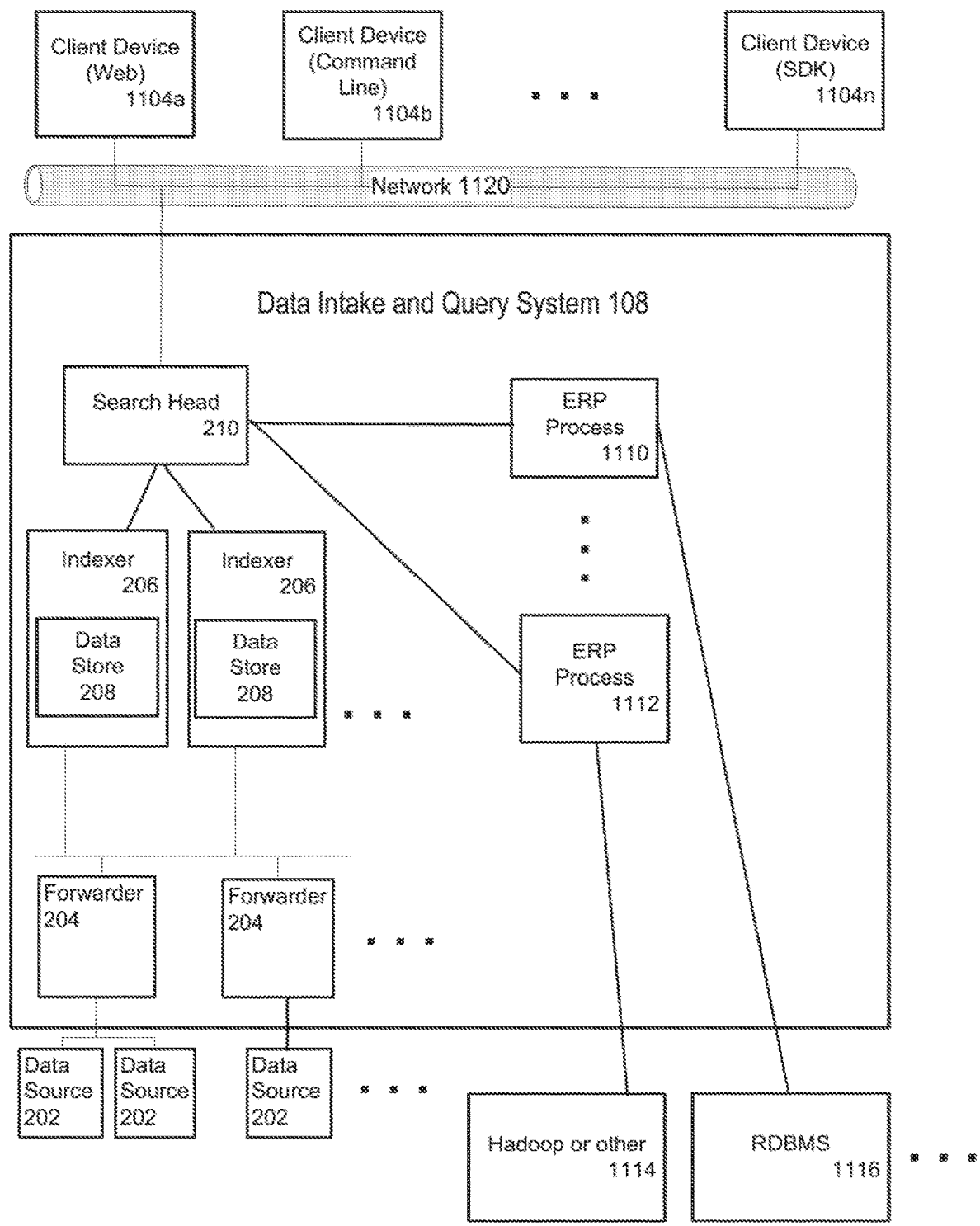
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.1. Location Intake and Data Query System

As described herein, various types of data may be stored and searchable at an intake and data query system. In some embodiments, the data may include location data such as geographic data. Although the present disclosure may generally discuss exemplary embodiments involving geographic data (e.g., data that may be associated with predefined coordinate system), the present disclosure may also be utilized with locations that are identified or associated with other reference systems. As is described herein, raw machine data may include various types of information that may be related to location. Such information may be converted to a common reference system (such as a coordinate system) or other reference systems. For example, in an environment such as a school, factory, mall, retail store, amusement park, or stadium, raw machine data may include information relating to beacons or wireless signals (e.g., WiFi signals), which may be used to identify a location associated with the raw machine data relative to a reference location in the environment. Accordingly, while the present disclosure may discuss geographic information, it will be understood that the systems and methods herein may be applied to any suitable location information.

Location data may include any suitable values that may be used to derive information about a location associated with an event. As with other types of data described herein, location data may be provided in raw machine data that is acquired and stored by the intake system, and may be searchable (e.g., using a late-binding schema) by the data query system. Location data may include any suitable values that provide a location or that may be used to derive a location, such as Geographic Coordinate System coordinates, Universal Transverse Mercator (UTM) coordinates, IP addresses, addresses, zip codes, municipalities, names of geographic features (e.g., lakes, rivers, mountains, creeks, etc.), cell tower identifiers, WiFi hotspot identifiers, beacon signals, or any other suitable information from which a location may be derived.

A data query system may be used to search events for the location. In some embodiments, a variety of different types of location data having different formats may be identified and converted to a common reference system for purposes of search, statistics, reports, visualizations, and any other suitable analysis. For example, a data query system searching geographic data may identify a variety of different types of values that include coordinates (e.g., latitude and longitude, or UTM coordinates) and other geographic data that can be associated with coordinates, and convert the different geographic data types into a common geographic system such as longitude and latitude for the Geographic Coordinate System. In this manner, disparate types of geographic data may be searched and analyzed based on this common reference system.

In some embodiments, it may be desired to search events for a particular location or for locations within a physical region such as a geographic region. Events may be queried for locations that match a requested location or fall within a requested region. Although events may be searched in any suitable manner, in one embodiment a point-in-polygon technique may be used to determine whether values (e.g., derived or determined coordinates) for location data of events correspond to a physical region or geographic region. A polygon may be associated with a region to be searched, with the interior region of the polygon defining the locations values that are responsive to the search. In some embodiments, the point-in-polygon technique may be performed in accordance with U.S. patent application Ser. No. 14/815,022, entitled "EFFICIENT POLYGON-CLIPPING TECHNIQUE TO REDUCE DATA TRANSFER REQUIREMENTS FOR A VIEWPORT", filed on 31 Jul. 2015, application Ser. No. 14/606,396, entitled "EFFICIENT POINT-IN-POLYGON INDEXING TECHNIQUE FOR PROCESSING QUERIES OVER GEOGRAPHIC DATA SETS", filed on 27 Jan. 2015, application Ser. No. 14/606,387, entitled "EFFICIENT POINT-IN-POLYGON TECHNIQUE TO FACILITATE DISPLAYING GEOGRAPHIC DATA," filed on 27 Jan., 2015, and application Ser. No. 14/700,685, entitled "THREE DIMENSIONAL POINT-IN-POLYGON OPERATION TO FACILITATE DISPLAYING THREE-DIMENSIONAL STRUCTURES," filed on 27 Jan. 2015, each of which is hereby incorporated by reference in its entirety for all purposes.

Figure 18:
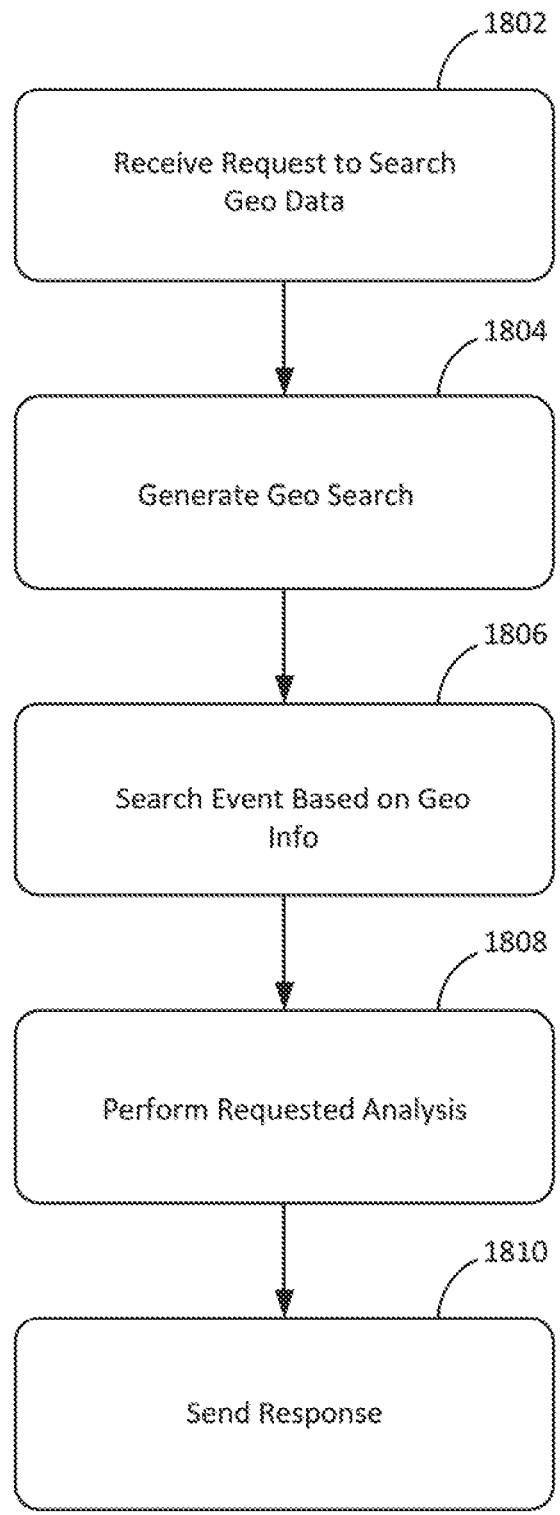
FIG. 18 depicts exemplary steps for searching geographic data in accordance with some embodiments of the present disclosure.

FIG. 18 depicts exemplary steps for searching geographic data in accordance with some embodiments of the present disclosure. Although the steps of FIG. 18 are generally described in the context of geographic data, it will be understood that they apply equally to other data such as any suitable location data. For example, location search information may describe any suitable reference to location. Geographic search information may refer to a type of location search information that is specific to searching for geographic information (e.g., coordinates). The steps depicted by FIG. 18 are provided for illustrative purposes only; those skilled in the art will understand that additional steps may be included, that one or more steps may be removed, and that the ordering of the steps of FIG. 18 may be modified in any suitable manner. It will be understood that while particular hardware, software, system components, geographic data types, and search techniques may be described in the context of FIG. 18, that the steps described herein are not so limited.

At step 1802, the data query system may receive a request to search events for geographic data. The request may include search information such as geographic search information that defines criteria for searching geographic data. In some embodiments, geographic search information may include any suitable criteria such as coordinates, information that may be used to derive coordinates, one or more previously defined geographic regions, any other suitable geographic criteria, or any combination thereof. In some embodiments, the geographic criteria may be provided within a unique JavaScript Object Notation for transmitting geographic information to the intake and query system (e.g., a Geo JSON). The request to search events for geographic data may also be a combined query that includes other search criteria such as a field search query, which may include any suitable fields of events to be searched as described herein. However, it will be understood that geographic search information may be provided in a separate query than the field search query, with the two queries being related so as to provide a single set of results. In one embodiment, timing criteria may be provided to specify time-sensitive or real-time monitoring, for example, based on a query that limits returned values to values that have occurred within a requested or recent time period. Once the request to search events for geographic data has been received, processing may continue to step 1804.

At step 1804, the data query system may generate the geographic search based on geographic search information. In some embodiments, generating the geographic search may comprise establishing coordinates for use by a point-in-polygon system. For example, in embodiments where the geographic search information includes information used to derive coordinates, the coordinates may be derived based on the information. Exemplary embodiments include deriving coordinates based on warehouse facilities, retail locations, transportation facilities, entertainment venues, transportation infrastructure, natural or artificial transportation arteries, municipal boundaries, any other suitable information, or any combination thereof. In some embodiments, predefined geographic regions may have an identifier and may be associated with known coordinates, such that the coordinates may be accessed based on the identifier being provided in the request to search geographic data. For example, in some embodiments, lookup definitions may be provided in a lookup table, and may be accessible based on criteria such as an identifier. The lookup definition may include the identifier and other information related to a predefined geographic region, such as a file including coordinates associated with the predefined geographic region. In some embodiments, the coordinates may be available from one or more keyhole markup language (KML) files, which may be stored within a keyhole markup language zipped (KMZ) file, or from an ERSI Shapefile (SHP). Once the geographic search is generated, processing may continue to step 1806.

At step 1806, the data query system may search events based on query such as a combined query that includes the geographic search information and the field search query. As described herein, the data query system may search events including raw machine data and metadata from a variety of heterogeneous data sources. In some embodiments, some stored events may include information that may be converted to a common reference system with the geographic search information (e.g., coordinates such as latitude and longitude) to be searched, as described herein. For example, information such as IP addresses, WiFi identifiers, cell tower locations, geographic features, or any other suitable information may be used to derive data (e.g., coordinates) for the common reference system. The coordinates for values of events may then be searched in any suitable manner, such as by using a point-in-polygon methodology. If a field search query is provided, the data query system may also search based on the field search query, limiting responsive values to those values that correspond to the both the geographic search information and the field search query. In some embodiments, a query having geographic search information may be provided separately from the field search query. Either query may be run first, with the other query searching the results of the first query. Whichever methods are used for searching based on queries with geographic search information, processing may then continue to step 1808.

At step 1808, the data query system may perform any requested analysis based on the values that are responsive to the search of step 1806. In some embodiments, a search request may also include a request to provide analysis of events, for example, for use in visualizations, reports, statistics, and other analysis, as described herein. Exemplary analyses may include counts (e.g., of events or values) for geographic regions, comparisons between different regions (e.g., choropleth maps), statistical analyses of values within geographic regions (e.g., average expenditures, etc.), other analyses described herein, and any combination thereof. Any suitable portion of the analysis may be performed at the data query system. In some embodiments, the data query system may analyze the responsive values and perform a complete analysis. In one embodiment, the data query system may search for the values that are responsive to the geographic search information and field search query, and generate the requested visualization based on those responsive values and associated time stamps. For example, a data query system may receive a request that includes search criteria for a company's vehicles and for a particular location, and a request to generate a visualization of how many of those vehicles entered that location during different time periods. In other embodiments, any suitable portion of this analysis may be performed by the data query system. Once any requested analysis has been performed, processing may continue to step 1810.

At step 1810, the data query system may return the results to the client. As described at steps 1802-1808, the results are responsive to the geographic search information and the field search query, and may include values, analysis, or any suitable combination thereof. The responsive results may be provided to the client, and the processing of the request may end.

3.2. User Interface for a Location Query System

Figure 19A:
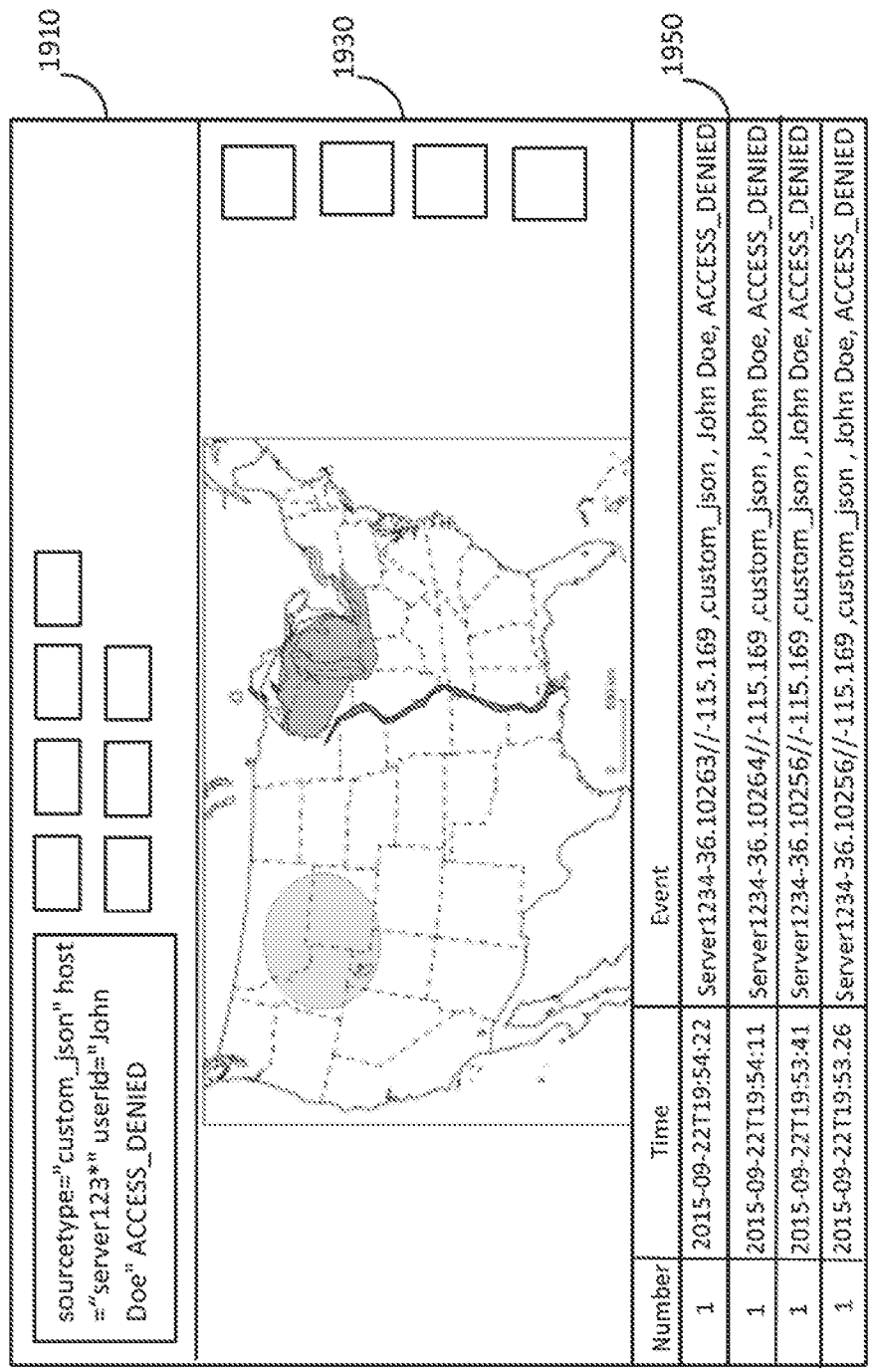
FIGS. 19A-19C depict an exemplary user interface in accordance with some embodiments of the present disclosure.

FIG. 19A depicts an exemplary user interface 1900 in accordance with some embodiments of the present disclosure. Although the user interface of FIG. 19A may be employed at any suitable location (e.g., client or server, remote or on-site) and using any suitable device (e.g., a computer, tablet, smart phone, etc.), in one embodiment the user interface of FIG. 19A may comprise a client user interface and may be employed on a display of a computer operating at a remote location from the data query system. The user interface of FIG. 19A may allow a user to generate combined queries including both location search information and a field search query, defining the location search information based on the creation of one or more ad-hoc boundary regions. Ad-hoc boundary regions are regions that may be modified by a user in a manner that is not confined to jurisdictional boundaries (e.g., national, state, municipality, county, etc.) or geographic boundaries (e.g., lakes, rivers, oceans, mountain ranges, etc.). Ad-hoc boundary regions may be created based on jurisdictional boundaries and geographic boundaries, as long as the result is not confined to jurisdictional boundaries or geographic boundaries. For example, an ad-hoc boundary region could be created from a jurisdictional boundary that is then expanded in a manner (e.g., drawing an irregular shape expanding into a neighboring jurisdiction) that results in a region that is no longer confined to jurisdictional boundaries. The combined query may be provided to a data query system for processing and responsive values and analysis may be received from the data query system, as described herein.

In the embodiment depicted in FIG. 19A, the location information to be searched may be geographic information. However, it will be understood that the user interface of FIG. 19A may be used for searching of any location information, instead of or in combination with the geographic information. Although a client user interface may include any suitable user interface elements, in some embodiments the user interface 1900 may include a query input portion 1910, an interactive geographic portion 1930, and a results display portion 1950. Although these user interface elements may be displayed in a particular arrangement and configuration in FIG. 19A, it will be understood that the user interface elements may be rearranged in any suitable manner, and that one or more of the display elements may be displayed separately (e.g., as a pop-up window) or in any other suitable manner (e.g., displaying results on a separate screen or window after running a search).

Figure 19B:
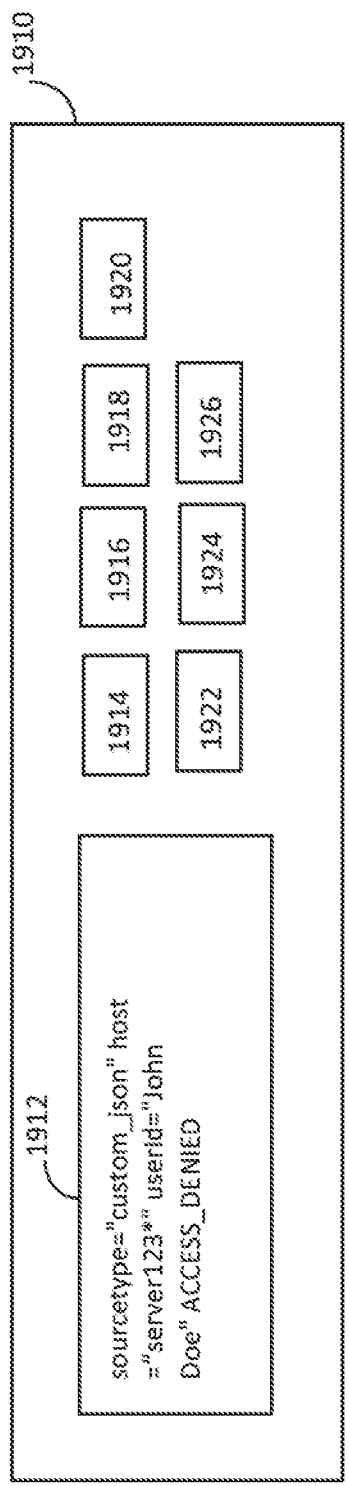

Referring to FIG. 19B, query input portion 1910 may comprise elements that facilitate the creation and running of search queries for data such as raw machine data that may be searched via a data query system. Although it will be understood that query input portion 1910 may include any suitable components, in an exemplary embodiment query input portion may include a search bar 1912, selection interfaces 1914, time range picker 1916, preexisting queries 1918, analysis selection 1920, test selection 1922, store selection 1924, and submit selection 1926.

Search bar 1912 may accept user input in the form of a search string (e.g., a search string written in SPL), which may define one or more extraction rules (e.g., based on a regular expression defined by a user), as described herein. In some embodiments, a portion of the search string may be automatically created or updated based on other inputs, for example, inputs to the interactive geographic portion 1930, selection interfaces 1914, and preexisting queries 1918. In some embodiments, the search bar 1912 may be utilized to then further modify the portion of the search string that was automatically created or updated. In this manner, a user may interactively create search strings, access preexisting search strings, and modify automatically created search strings, as part of creating a search string to be submitted to the data query system as the field search query.

A selection interface 1914 may allow for the automatic creation of portions of a field search query based on user selections. The selection interface 1914 may be applied to any suitable field or combination of fields, and may include any suitable interface, such as pull down menus, text input boxes, numerical selection interfaces, and binary selections. A selection within the selection interface may result in an appropriate search string being automatically created and added to a field search query or search bar 1912. For example, in one embodiment a custom selection interface 1914 may allow for selection of carriers that provide shipments to a business. Selection of one or more carriers may result in an appropriate search string being automatically created within search bar 1912, after which a user may modify the newly created search string.

A time range picker 1916 may allow for the selection of a time range. In some embodiments, the time range picker 1916 may also result in a selection of a real-time time range, in which search results are limited to the most recent results. In some embodiments, a definition of real time (e.g., only current results, results within the last 30 seconds, one minute, etc.) may be set as a default, or may be selected within the time range picker 1916. A selection within the selection interface may result in an appropriate search string being added to a field search query or search bar 1912. For example, in an exemplary embodiment of carriers that provide shipments to a business, selection of real time analysis within time range picker 1916 may result in the automatic generation of an appropriate search string within the field search query, such that only real time values corresponding to carriers that provide shipments to the business are returned by the data query system.

Preexisting queries 1918 may allow for the selection of queries that already exist, such as query templates or commonly-used queries that have been saved by a user. Any suitable interface for preexisting queries 1918 may be provided in accordance with the present disclosure, such as pull-down menus, search interfaces, and browsing interfaces. In some embodiments, the client system may access preexisting queries from another device over a network. As described herein, in some embodiments a location identifier (e.g., a geographic identifier) may correspond to a definition of an ad-hoc boundary region stored at the intake and query system, and the preexisting queries 1918 may be based on the location identifiers. A selection of the preexisting query may result in an appropriate search string (e.g., including the location identifier) being added to a field search query or search bar 1912. For example, in one embodiment of carriers that provide shipments to a business, a plurality of search string templates may be provided to select particular carriers or products, and upon selection of the template, the search bar 1912 may be automatically populated with the search string template.

An analysis selection interface 1920 may facilitate the selection of analyses to be performed by the client system and data query system. Any suitable interface for analysis selection 1920 may be provided in accordance with the present disclosure, such as pull-down menus, search interfaces, and browsing interfaces. In some embodiments, the client system may have the ability to access different types of analyses from over a network, for example, from a server. An analysis selection may result include a selection of statistics, time series data, visualizations, or any other suitable analysis or representation of values accessible from events stored at the data query system. One or more of these analyses may then be depicted within the interactive geographic portion 1930 and results display portion 1950 as described herein. A selection within the analysis selection interface 1920 may result in an appropriate search string being added to a field search query or search bar 1912. In some embodiments, a user may then modify the analysis string within the search bar 1912.

Test selection 1922 may facilitate the testing of search queries. In some embodiments, it may be desirable to test a search query, for example, by running a search query against a subset of data. Test selection may allow for a user to run such a test query, and may be any suitable interface (e.g., a button, menu selection, etc.) located within any suitable portion of the interactive display (e.g., within the query input portion or results display portion). Selecting the test selection may result in providing a test query to test data (e.g., recent data received at the client or a subset of data available from a data query system). For example, in one embodiment, selection of test selection 1922 may result in the current query (e.g., the search string of the current query box and any other selections as described herein) being transmitted to the data query system, which may return values or events. In some embodiments, an event may be returned that has values associated with the current search query emphasized in some manner (e.g., highlighting, bold, italics, etc.). These results may be displayed, for example, as the results display output in the results display portion 1950. In some embodiments, while the test selection 1922 remains selected, changes in the search string or other search criteria may be dynamically changed in the events, and in some embodiments, the search string may be modified based on selections of examples and counter examples within the displayed results.

Store selection 1924 may allow a user to select a search query for later use. Store selection 1924 may be implemented in any suitable manner, such as a button or pull down menu, and in some embodiments, may provide options for storing different aspects of a search query, such as a search string or one or more selections from query input portion 1910. When store selection 1924 is selected, the selected aspects of the search query may be made available for future use, e.g., as preexisting queries 1918.

Submit selection 1926 may allow a user to submit a query to a data query system. The submit selection 1926 may include any suitable selection mechanism such as a button, a menu, a pull-down menu, or a keyboard stroke (e.g., a carriage return). In response to the submit selection 1926 a field search query may be created based on the search string of the input bar 1912 and in some embodiments, other inputs and selections of query input portion. In some embodiments, geographic search information may also be generated in response to the submit selection 1926, for example, based on interactive geographic input in the interactive geographic portion 1930. In some embodiments, a combined query may be generated based on the field search query and the geographic search information. The combined query may be generated in any suitable manner, such as by appending a geographic search query including the geographic search information to the field search query, or inserting the geographic information (e.g., identifiers, coordinates, etc.) into the field search query. The combined query may then be provided to the data query system for processing.

Figure 19C:
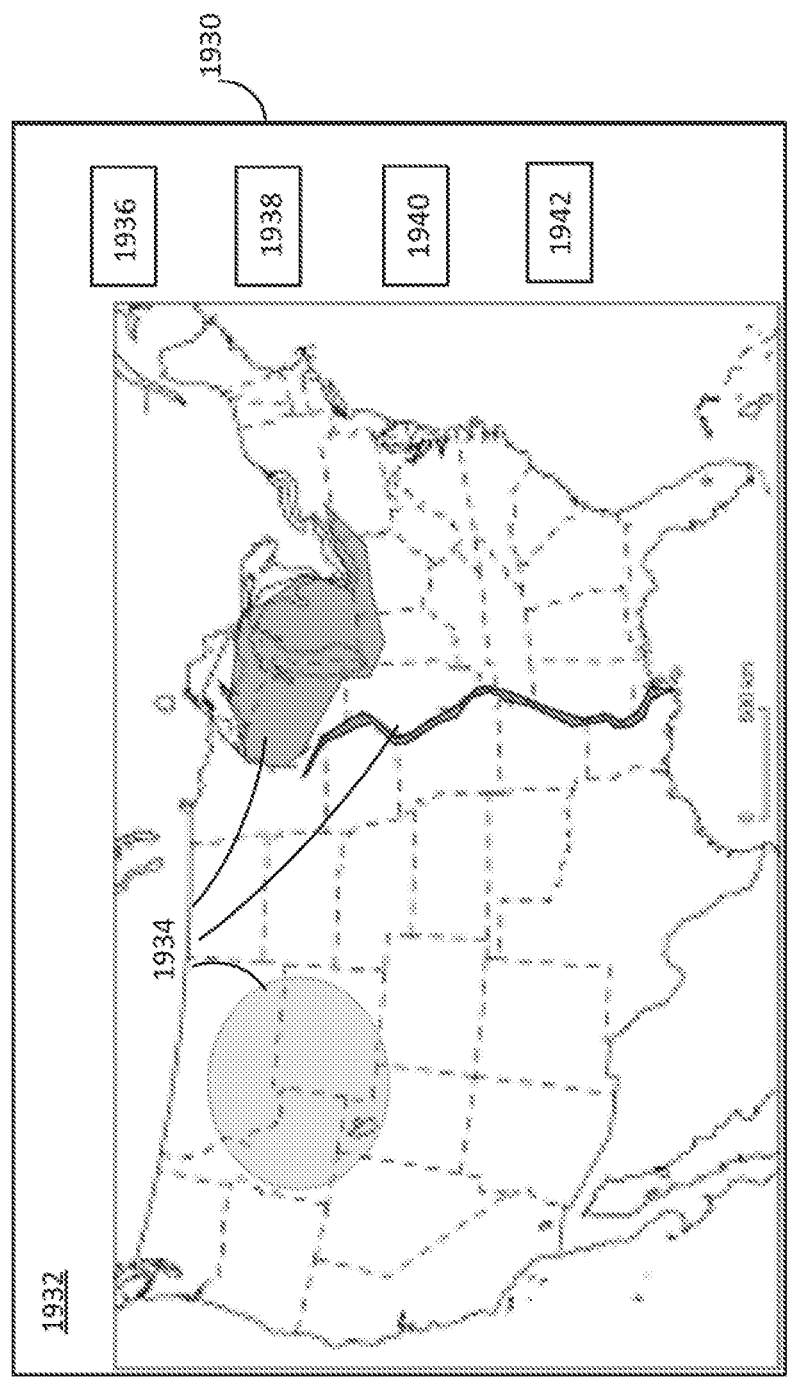

Referring to FIG. 19C, interactive geographic portion 1930 may comprise elements that facilitate the creation of ad-hoc boundary regions based on a map input provided by a user, and the generation of geographic search information for searching geographic regions within a data query system. By defining ad-hoc regions and generating geographic search information, events having values that correspond to the field search query may be further filtered based on the geographic search information. Although the present discussion of user interface 1900 is provided in the context of an interactive geographic portion, it will be understood that an interactive map portion may be provided in a similar manner, and may be applicable to any type of location information (e.g., locations within a school, factory, mall, retail store, amusement park, or stadium), to generate ad-hoc boundary regions for use in generating location search information for the intake and query system. For example, ad-hoc boundary regions may be defined based on relative distances to a reference point at a location.

Although it will be understood that interactive geographic portion 1930 may include any suitable components to facilitate the user providing the map input, in an exemplary embodiment interactive geographic portion may include map portion 1932, user-defined overlay 1934, map view portion 1936, geographic tool selection 1938, preexisting ad-hoc boundary region selection 1940, and region storage selection 1942.

Map portion 1932 may include a display of a map for use in the definition of ad-hoc boundary regions. Although it will be understood that any suitable map may be depicted within map portion 1932 in accordance with the present disclosure, in some embodiments map portion may include a two-dimensional map of a geographic region. Although a two-dimensional black-and-white map may be depicted in FIGS. 19A and 19C, it will be understood that the map may provide any suitable depiction of the geographic region, including images or other representations of the geographic region. The map may include other information such as jurisdictional information, labels of for geographic features, topographical information, depth information, or map-specific information such as the presence of forests, wildlife population, arable land, human population, population density, energy usage, or any other suitable information that may be displayed on a map. In some embodiments, any of this information may be selectable by a user, for example, by selecting a region, a label associated with a region or information depicted on the map, definition of criteria for map-specific information depicted on a map, or any other suitable selection method.

User-defined overlay 1934 may depict ad-hoc boundary regions overlaying the map portion 1932. In some embodiments, a plurality of user-defined regions may define a single ad-hoc boundary region, based on the user's definition of that region. Although it will be understood that user-defined overlay 1934 may depict the ad-hoc boundary regions in any suitable manner, in some embodiments the ad-hoc boundary regions may be partially transparent such that the content of the underlying map is visible through the ad-hoc boundary regions. In some embodiments, depictions of ad-hoc boundary regions may include degrees of color, shading, contrast, opacity, and other suitable visual depictions that allow ad-hoc boundary regions to be distinguished from the underlying map and from each other. In some embodiments, the depictions may be individually modifiable for each ad-hoc boundary region, and depictions may change, for example, based on a number of responsive values within respective ad-hoc boundary regions or a relative proportion of responsive values within a respective ad-hoc boundary region.

Map view portion 1936 may provide an interface that allows a user to modify the current map view. Although map view portion 1936 is depicted as a simple box in FIG. 19C, it will be understood that varied tools may be provided for modifying a current map view at various locations within the interactive geographic portion 1930. For example, a dragging tool (e.g., a hand depicted over the map portion 1932) may permit a user to drag the map. Zooming interfaces (e.g., zoom buttons or sliding selectors) may change the zoom of the map. Depicted information (e.g., map-specific information such as population density or arable land) may be changed based on a selection from a menu or other interface. The geographic region represented by the map may be changed (e.g., by changing a selection of a depicted jurisdictions). In this manner, map view portion 1936 may allow a user to modify not only the portion of the map that is visible but the type of information that is visible, and in some embodiments, may be used as a basis for creation of an ad-hoc boundary region.

Geographic tool selection 1938 may provide an interface for selection from a variety of tools for creating ad-hoc boundary regions. It will be understood that geographic tool selection 1938 may use any suitable user interface techniques for receiving selection of a tool for creating ad-hoc boundary regions, such as drop down menus or selectable icons. Although any suitable tools may be selected in accordance with the present disclosure, in an embodiment the tools may include a free-form drawing tool, a point-to-point drawing tool, a center point and radius drawing tool, a geographic feature selection tool, and a map-specific information selection tool.

An exemplary free-form drawing tool may allow a user to drag the tool to create a region using an interface such as a mouse, a touch-screen, or a stylus. The region may track the path that the user selects, creating a completed ad-hoc boundary region once the path results an enclosure of a region, with the enclosed region corresponding to the ad-hoc boundary region. In some embodiments, if the path created by the user does not create an enclosed region, one or more options for an enclosed region may be created based on the path. In the case of more than one potential enclosed regions, the user may be permitted to view a preview and select from the available regions.

A point-to-point drawing tool may allow a user to define a set of points, with lines between the points resulting in the creation of an enclosed region that defines the ad-hoc boundary region. In an exemplary embodiment, a user may select a series of points in sequence. For each set of consecutive points, a line may be drawn between the points. When the final point corresponds to initial point, or in some embodiments, when the lines created by the set of points create an enclosed region, the ad-hoc boundary regions may be completed. In some embodiments, a user may make a selection to create an enclosed region based on points and lines that do not yet form an enclosed region, in which case the enclosed region defining the ad-hoc boundary region may be created automatically. In some embodiments, the connecting line between two consecutive points need not be a straight line, and may be created in other paths (e.g., arcs). In some embodiments, the lines defining the ad-hoc boundary region may be modifiable after the ad-hoc boundary region is initially created.

A center point and radius drawing tool may allow a user to create a circle by selecting or defining a center point for a circle and defining a radius or diameter for the circle. The completed circle may define an ad-hoc boundary region. The selection of the center point may be performed in any suitable manner, such as by pointing to a center point (e.g., with a mouse, touch screen, or stylus), defining coordinates for a center point, or defining a location for the center point. The selection of the radius or diameter may also be performed in any suitable manner, such as by pointing to or dragging a point located at the circumference of the circle or typing a value for the radius (e.g., in miles).

A shape creation tool may allow for the creation of other shapes such as squares, rectangles, triangles, polygons, ovals, etc. A shape creation tool may use any suitable user interface (e.g., selection mechanisms such as a mouse, touch screen, stylus, text input, menus, or any suitable combination thereof) for creation of a tool. In some embodiments, icons may be dragged and dropped, and shapes may be manipulated (e.g., expanded, rotated, combined, etc.). The resulting shape may define an ad-hoc boundary region.

A geographic feature selection tool may allow any suitable geographic feature such as rivers, mountains, bays, canyons, and other features to be selected. Geographic features may be selected in any suitable manner, such as by physically selecting a feature (e.g., clicking on or selecting a geographic feature with a mouse, touch screen or stylus), searching for a feature (e.g., via a search engine), or selecting from available features within the map area (e.g., from a menu of selectable features). The enclosed region created by the geographic selection tool may define the ad-hoc boundary region. In some embodiments, once a geographic feature is selected and depicted within the user-defined overlay, the shape may be modified by a user.

As described above, in some embodiments a depicted map may include map-specific information such as such as the presence of forests, wildlife population, arable land, human population, population density, energy usage, or any other suitable information. In some embodiments, this information may be used to determine one or more ad-hoc boundary regions. Although map-specific information may be selected in any suitable manner, in some embodiments the selection mechanism may depend on the type of map specific information. For example, certain types of map specific information such as forests or arable land may define contiguous areas that may be selected by a user. Other types of map-specific information may be selected based on a criteria, such as areas have a population density greater than a threshold. The geographic regions defined by such map-specific information may define one or more ad-hoc boundary regions.

Whatever tool or combination of tools is used to create an ad-hoc boundary region, the ad-hoc boundary region is used to generate geographic search information that is associated with the locations and scale depicted in the underlying map. Although those boundaries may be defined in any suitable manner, in some embodiments a set of coordinates may be determined that correspond to the exterior boundary of the ad-hoc boundary region. It will also be understood that other geographic search information may be determined, for example, based on a combination of coordinates and line and shape definitions.

Preexisting ad-hoc boundary region selection 1940 may facilitate a user selecting one or more preexisting ad-hoc boundary regions for display on the user-defined overlay of the map display of the geographic region. Although a preexisting ad-hoc boundary region may originate from a variety of sources, in some embodiments the preexisting ad-hoc boundary regions may be user-generated, accessed from the intake and data query system, or provided from a remote library accessible over a network. Preexisting ad-hoc boundary region selection 1840 may include any suitable user interface for selecting from among available preexisting ad-hoc boundary regions, such as menus and search engines. A plurality of preexisting ad-hoc boundary regions may be selected at any one time. In some embodiments, a plurality of preexisting ad-hoc boundary regions may be previewed to a user, for example, by using different colors for the user-defined overlay for different preexisting ad-hoc boundary regions.

Region storage selection 1942 may allow a user to select a depicted ad-hoc boundary region for storage for later use. Although depicted as a simple box in FIG. 19C, it will be understood that any suitable user interface mechanism may be utilized for regions storage selection 1942. In some embodiments, multiple regions may be combined into a single ad-hoc boundary region. A plurality of ad-hoc boundary regions may be stored at one time. The user interface of the region storage selection 1942 may permit the user to modify and enter information about an ad-hoc boundary region, such as a name, identifier, description, or any other suitable information.

Results display portion 1950 may provide for the display of results that are received from the intake and query system, in response to the combined query. Although it will be understood that any suitable results may be displayed in the results display portion, examples of results may include responsive value, responsive events, statistics, visualizations, analyses, or any suitable combination thereof. In some embodiments, a user may be able to select between different results to be displayed within the results display portion. Moreover, the results display and order of results may be modified based on a user selection (e.g., chronological order, alphabetical order, numerical value, etc.).

In some embodiments, the interactive geographic portion 1930 may display geographic visualizations, such as real-time depictions of the number of values and events (e.g., a count, a choropleth display, etc.) that are responsive to the search query, and analyses of results. Results display portion 1950 may include results (e.g., values or events) that correspond to a region of the map (e.g., a selected ad-hoc boundary region).

Figure 20:
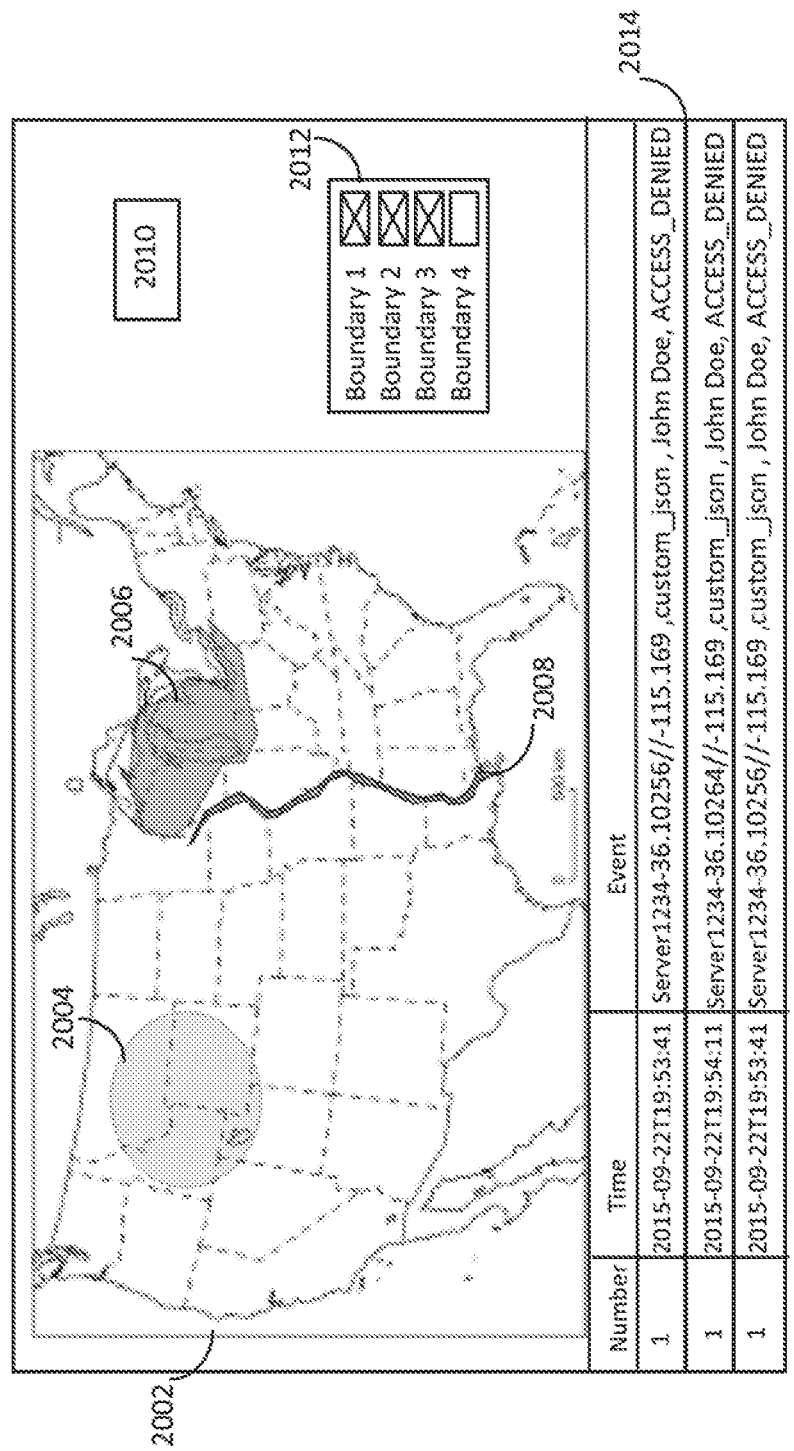
FIG. 20 depicts an exemplary choropleth geographic visualization in accordance with some embodiments of the present disclosure.

FIG. 20 depicts an exemplary choropleth geographic visualization in accordance with some embodiments of the present disclosure. Although FIG. 20 is depicted in the context of a geographic visualization, it will be understood that a similar visualization may be equally applied to any other sort of location information, such as locations within a school, factory, mall, retail store, amusement park, or stadium. It will be understood that the exemplary depiction of FIG. 20 includes only a portion of the display, and that certain display elements have been excluded for the sake of clarity. The choropleth geographic visualization includes a map region 2002, first ad-hoc boundary region 2004, second ad-hoc boundary region 2006, third ad-hoc boundary region 2008, selection interface 2010, and geofencing interface 2012. Depicted below the choropleth map is a results display 2014.

Map region 2002 may be modifiable and selectable, as described herein. As the map region 2002 is changed to include a different geographic region, the selection interface 2010 may also be updated to include different ad-hoc boundary regions that are available for selection. In the exemplary embodiment of FIG. 20, four ad-hoc boundary regions are selectable within selection interface 2010, but the only three regions displayed are those associated with first ad-hoc boundary region 2004, second ad-hoc boundary region 2006, and third ad-hoc boundary region 2008, based on the selection within selection interface 2010.

As is depicted by the different shading of the first, second, and third ad-hoc boundary regions in FIG. 20, the choropleth display may provide for a visual depiction of the number of responses (e.g., events or values) corresponding to each ad-hoc boundary region (e.g., as determined by a intake and query system utilizing a point-in-polygon technique. Additional information may be displayed for each ad-hoc boundary region, such as a count of the number of responses. In some embodiments, the displayed results may be modified based on a user selection of one of the ad-hoc boundary regions. For example, based on the selection of the second ad-hoc boundary region 2006, results for the second ad-hoc boundary region 2006 may be displayed.

As described herein, a time range picker may allow for the selection of results for any suitable time frame, including real-time results. In some embodiments, the time range picker may be integrated with the interactive geographic portion of the display. In an exemplary embodiment of real-time results, the choropleth display of the ad-hoc boundary regions may update dynamically, such that the display of each of the regions changes with the volume or real-time data.

In some embodiments, a user may also configure notifications based on a geofencing interface 2012. Although a geofencing interface 2012 may display any suitable information, in some embodiments it may provide selectable thresholds, ranges, values, or any combination thereof, for selection of criteria for providing a notification. For example, if a number of responses within an ad-hoc boundary region exceeds a threshold, a notification may be provided. Similarly, certain values may be flagged as requiring a notification. The notification may also be selectable, and includes any suitable notification such as an update to any portion of the display, a sound notification, an electronic notification (e.g., text or e-mail), logging of data to a data storage system, invoking of software and hardware to perform a task, any other suitable notification, or any combination thereof.

Figure 21:
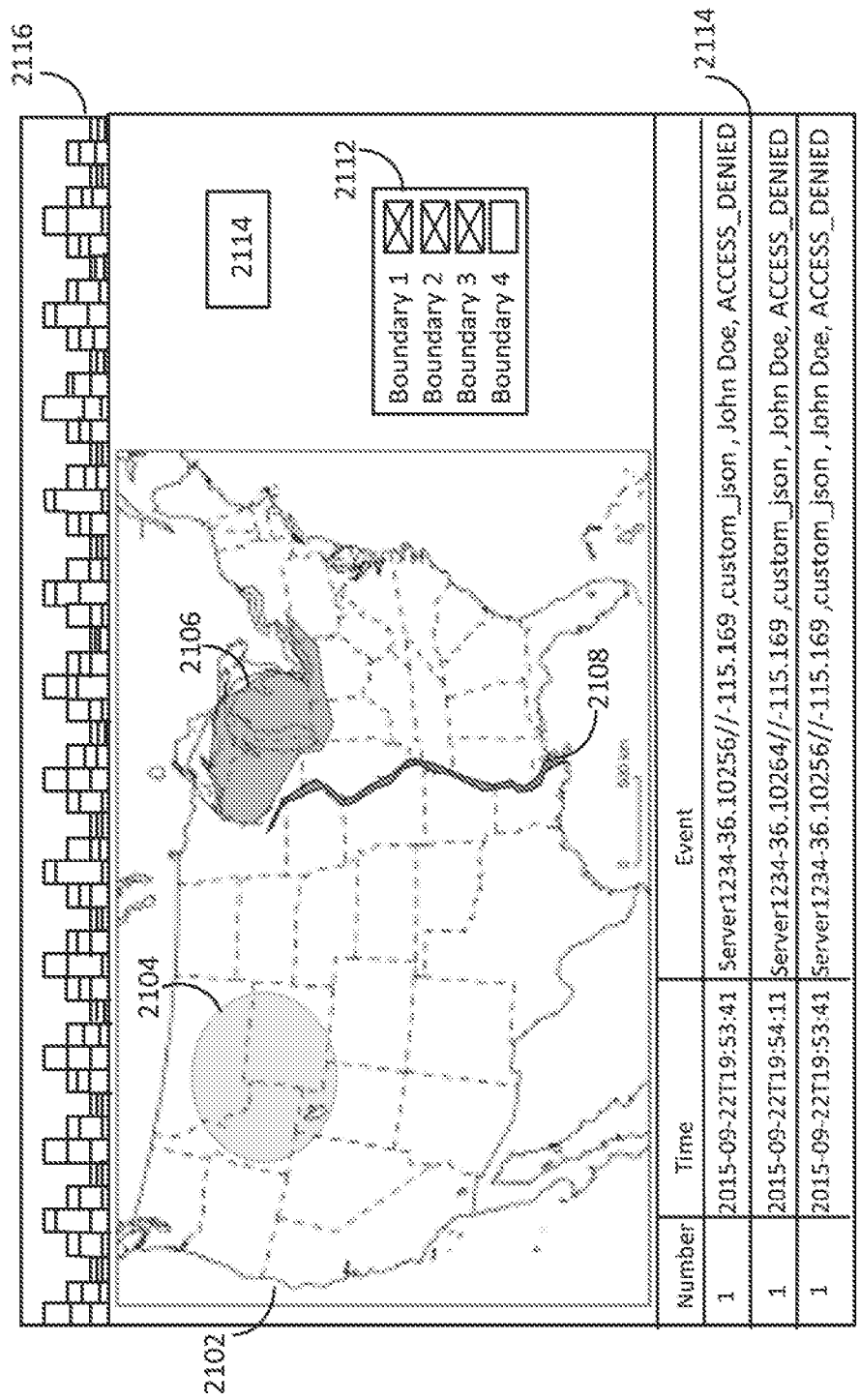
FIG. 21 depicts an exemplary time-series geographic visualization in accordance with some embodiments of the present disclosure.

FIG. 21 depicts an exemplary time-series geographic visualization in accordance with some embodiments of the present disclosure. Although FIG. 21 is depicted in the context of a geographic visualization, it will be understood that such a similar visualization may be equally applied to any other sort of location information, such as locations within a school, factory, mall, retail store, amusement park, or stadium. The time-series geographic visualization includes a map region 2102, first ad-hoc boundary region 2104, second ad-hoc boundary region 2106, third ad-hoc boundary region 2108, selection interface 2110, geofencing interface 2112, and time-series selection interface 2116. Depicted below the choropleth map is a results display 2114. Although the time-series geographic visualization may function in any suitable manner, in one embodiment the components of the time-series geographic visualization may function in a similar manner to the choropleth geographic visualization of FIG. 20.

Time-series selection interface 2116 may provide a visual display of the occurrence of events on a time scale, and may allow for the selection of a range of events to display within the geographic visualization and the results display 2114. Although time-series selection interface may depict the visual display of occurrences in any suitable manner, in one embodiment bars may represent the number of results corresponding to a particular time range. In some embodiments, the interface may provide a separate display for each of the ad-hoc boundary regions. In other embodiments, the display may be combined by stacking color-coded bars associated with each of the ad-hoc boundary regions, as is depicted in FIG. 21. Although a time range may be selected in any suitable manner, in an embodiment the time range may be selected by selecting two bars that define the time range.

Figure 22:
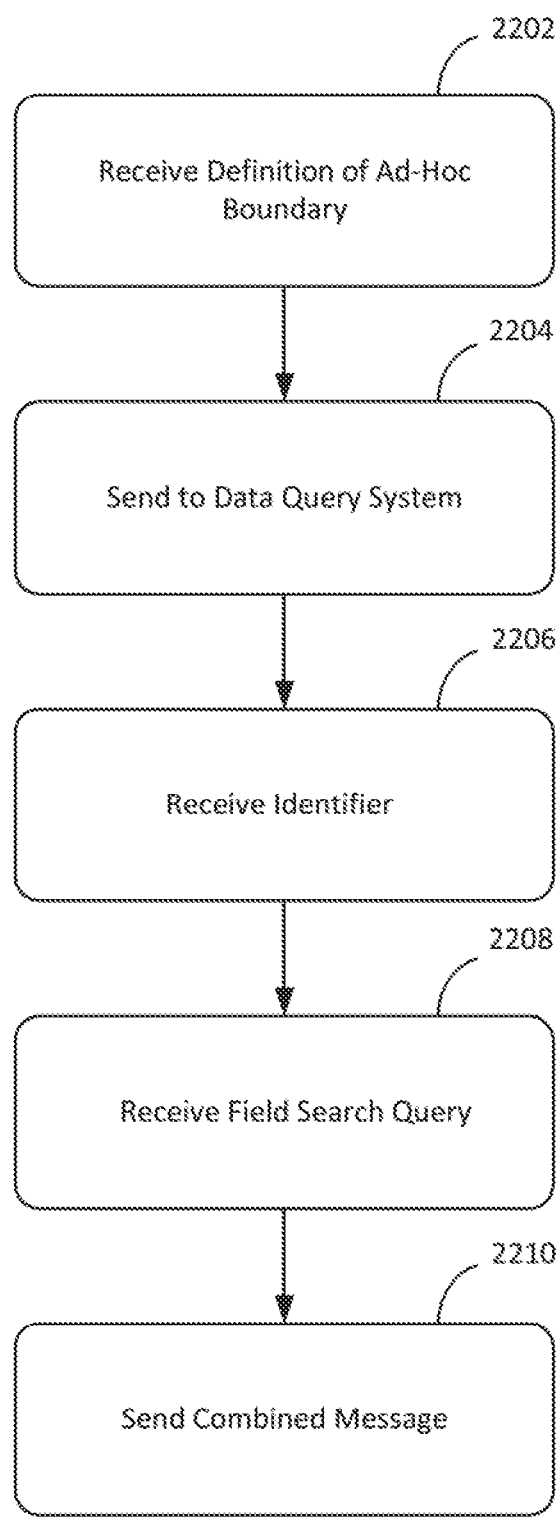
FIG. 22 depicts exemplary steps for generating a combined query in accordance with some embodiments of the present disclosure.

FIG. 22 depicts exemplary steps for generating a combined query in accordance with some embodiments of the present disclosure. The steps depicted by FIG. 22 are provided for illustrative purposes only; those skilled in the art will understand that additional steps may be included, that one or more steps may be removed, and that the ordering of the steps of FIG. 22 may be modified in any suitable manner. It will be understood that while particular hardware, software, system components, geographic data types, and search techniques may be described in the context of FIG. 22, that the steps described herein are not so limited. Although the steps of FIG. 22 are provided in the context of a geographic search, it will be understood that similar steps are similarly applicable to any other location information, such as locations within a school, factory, mall, retail store, amusement park, or stadium.

At step 2202, a device such as a client device may receive a definition of an ad-hoc boundary region. As described herein, there are a variety of methods by which a user may define an ad-hoc boundary region (e.g., based on a user selection within an interactive geographic portion 1830). A plurality of non-contiguous regions may define one ad-hoc boundary region, and a plurality of ad-hoc boundary regions may be defined at the same time. The ad-hoc boundary region may be depicted as a user-defined overlay for a geographic region that is depicted within the interactive geographic portion. Once the ad-hoc boundary region has been defined, processing may continue to step 2204.

At step 2204, the device such as the client device may generate and send geographic search information (e.g., coordinates defining an ad-hoc boundary region, sent within a specific Geo JSON) to the intake and data query system. The geographic search information is generated based on the ad-hoc boundary regions, and may include information such coordinates that define the ad-hoc boundary region. The message may be sent at any suitable time, such as after a user provides a request to provide the ad-hoc boundary region to the data query system, or asynchronously whenever an ad-hoc boundary region is added or modified. In some embodiments, the geographic search information may be sent along with a request for information, such as an identifier for the ad-hoc boundary region being submitted to the data query system. Once the geographic search information is sent, processing may continue to step 2206.

At step 2206, the device such as the client device may receive an identifier that may be used to identify the ad-hoc boundary region. In this manner, the client device can quickly and easily request a search for events within the ad-hoc boundary region based on the reference. In some embodiments, the reference (e.g., a name or identifier) may be stored along with a definition of the ad-hoc boundary region, for later use (e.g., for providing preexisting ad-hoc boundary region selection 1940). Once the identifier has been received, processing may continue to step 2208.

At step 2208, the device such as the client device may generate the field search query, for example, based on a regular expression and selections made within the query input portion 1910, as well as other inputs. The field search query may provide information for conducting a query for values within events, as well as parameters for the data query system to perform analysis and provide visualizations. Once the field search query is generated, processing may continue to step 2210.

At step 2210, the device such as the client device may generate a combined message based on the field search query and the geographic search information or identifier. Although the combined message may be described as a single message, it will be understood that a combined message may include a group of messages that are related such that a search can be performed that satisfies both the field search query and the geographic search information. Once the combined message has been generated, the combined message may be transmitted to the data query system for processing. The steps of FIG. 22 may then end.

Figure 23:
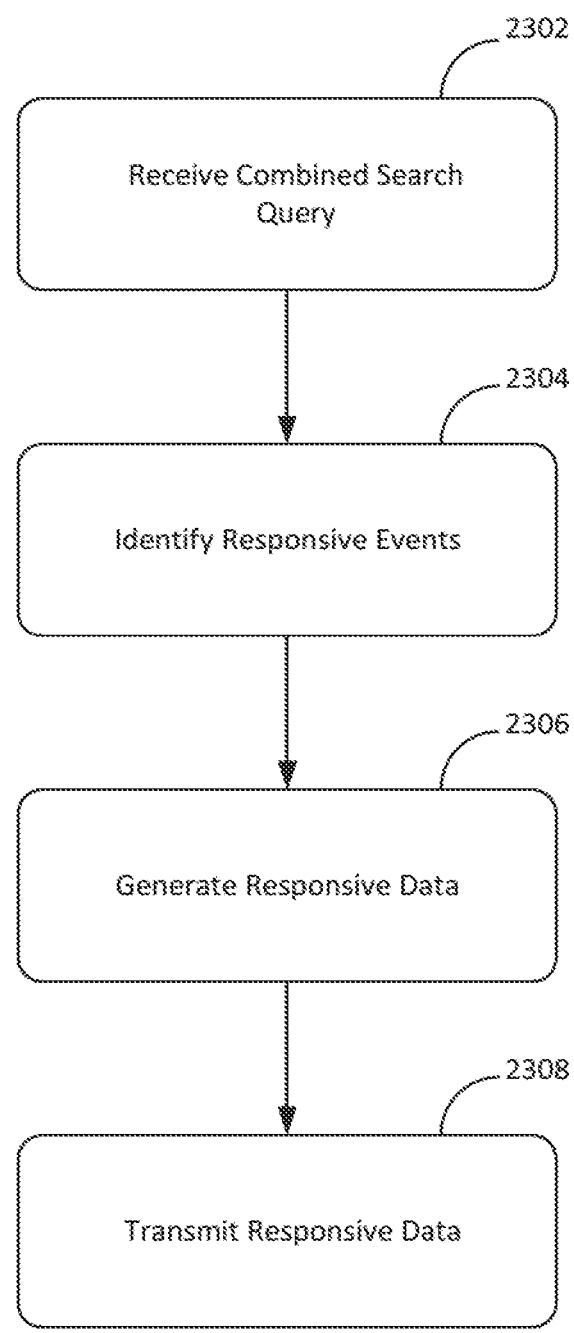
FIG. 23 depicts exemplary steps for processing of a combined query by a data query system in accordance with some embodiments of the present disclosure.

FIG. 23 depicts exemplary steps for processing of a combined query by a data query system in accordance with some embodiments of the present disclosure. The steps depicted by FIG. 23 are provided for illustrative purposes only; those skilled in the art will understand that additional steps may be included, that one or more steps may be removed, and that the ordering of the steps of FIG. 23 may be modified in any suitable manner. It will be understood that while particular hardware, software, system components, geographic data types, and search techniques may be described in the context of FIG. 23, that the steps described herein are not so limited. Although the steps of FIG. 23 are provided in the context of a geographic search, it will be understood that similar steps are similarly applicable to any other location information, such as locations within a school, factory, mall, retail store, amusement park, or stadium.

At step 2302, the data query system may receive and process the combined query. The data query system may determine searches to perform based on the field search query, identify requested statistics and analyses, identify on or more ad-hoc boundary areas to be searched (e.g., based on an identifier provided as the geographic search information), or prepare to perform any other suitable analyses or operations. Processing may then continue to step 2304.

At step 2304, the data query system may identify responsive events. As described herein, the data query system may utilize a technique such as point-in-polygon technique to search for events that occur within the ad-hoc boundary, while utilizing event searching to identify events that meet the field search query (e.g., including requested fields and meeting time range criteria). The search results may be limited to events that include fields and values that are responsive to both the geographic search information and the field search query. In some embodiments, a search may first be performed for events that are located within the ad-hoc boundary region, and the resulting records may be searched based on the field search query. In some embodiments, a search may first be performed for events that are responsive to the field search query, and the resulting records may be searched to determine whether they are located within the ad-hoc boundary region. In some embodiments, both types of searches may be performed in parallel and events satisfying both searches may be identified as responsive events. Once the responsive events have been identified, processing may continue to step 2306.

At step 2306, the data query system may generate the query responses. Although generating query responses may be performed in any suitable manner, in some embodiments the events, values, analysis, visualizations, or any combination thereof may be generated based on the combined query. The query responses may be associated with information such as a timestamp and an identifier for the ad-hoc boundary region that corresponds to each query response. Processing may then continue to step 2308, at which the data query system may transmit the query responses to the client. Processing of the steps of FIG. 23 may then end.

Figure 24:
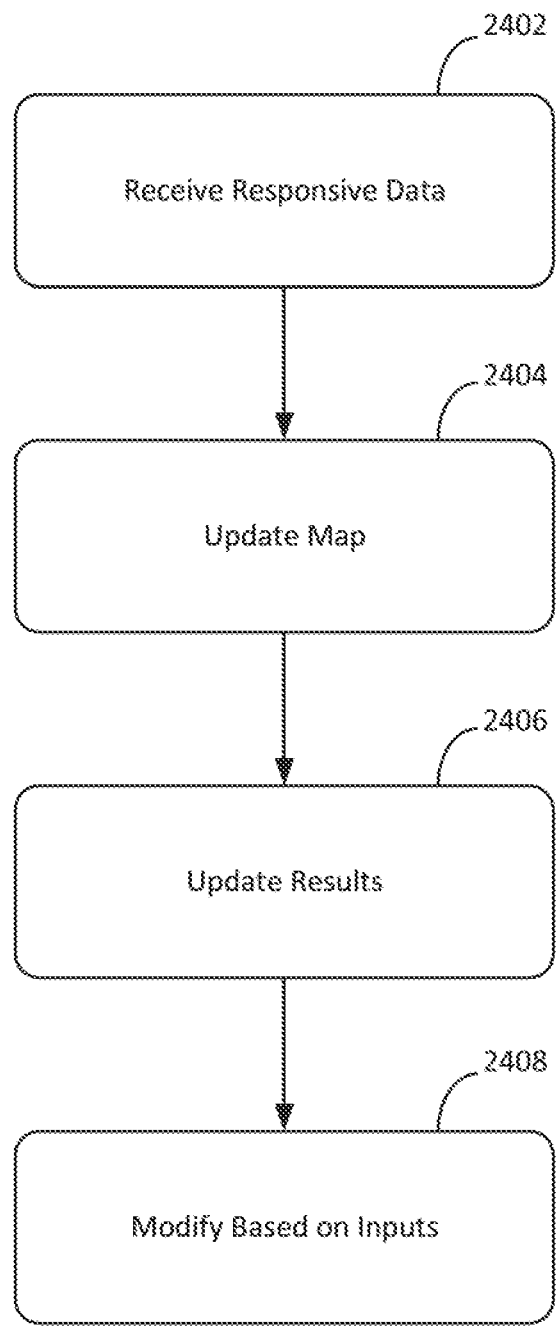
FIG. 24 depicts exemplary steps for processing and displaying query responses in accordance with some embodiments of the present disclosure.

FIG. 24 depicts exemplary steps for processing and displaying the query responses in accordance with some embodiments of the present disclosure. The steps depicted by FIG. 24 are provided for illustrative purposes only; those skilled in the art will understand that additional steps may be included, that one or more steps may be removed, and that the ordering of the steps of FIG. 24 may be modified in any suitable manner. It will be understood that while particular hardware, software, system components, geographic data types, and search techniques may be described in the context of FIG. 24, that the steps described herein are not so limited. Although the steps of FIG. 24 are provided in the context of a geographic search, it will be understood that similar steps are similarly applicable to any other location information, such as locations within a school, factory, mall, retail store, amusement park, or stadium.

At step 2402, the device such as the client may receive the query responses for updating the display. In some embodiments receiving the query responses may include extracting events, values, metadata, analysis results, and visualizations, timestamps, and geographic identifiers from the query responses. In some embodiments, some or all of the analysis and generation of visualizations may occur at the client (e.g., based on received values, associated timestamps, and geographic identifiers). Processing may then continue to step 2404.

At step 2404, the interactive geographic display (e.g., interactive geographic portion) of the display may be updated based on the received query responses. For example, a choropleth display may be updated based on the number of events falling within each ad-hoc boundary region, and the value of a numeric indicator may also be updated. Display elements such as a time-series of a time-series playback display may be updated. Processing may then continue to step 2406.

At step 2406, the results display (e.g., results display portion) may be updated to provide a results display output. As described herein, any suitable results (e.g., events, values, analyses, visualizations, etc.) may be displayed as the results display output. In some embodiments, results may be displayed separately for each ad-hoc boundary region, and the display of results may be changed based on any suitable field, metadata, values, statistics, or other information, or any combination thereof. Once the results display is updated, processing may continue to step 2408.

At step 2408, the display may be updated based on user inputs. As described herein, a user may be able to make selections that may modify the display of results. In some embodiments, it may also be possible to locally perform additional querying, analysis, and visualizations on the received results, i.e., without querying the data query system. Any changes to the data to be displayed as a result of such user inputs will be provided as updates of the display. The processing of the steps of FIG. 24 may then end.

The foregoing provides illustrative examples of the present disclosure, which are not presented for purposes of limitation. It will be understood by a person having ordinary skill in the art that various modifications may be made by within the scope of the present disclosure. It will also be understood that the present disclosure need not take the specific form explicitly described herein, and the present disclosure is intended to include variations to and modifications thereof, consistent with the appended claims. It will also be understood that variations of the systems, apparatuses, and processes may be made to further optimize those systems, apparatuses, and processes. The disclosed subject matter is not limited to any single embodiment described herein, but rather should be construed in breadth and scope in accordance with the appended claims.

What is claimed is:

1. A computer-implemented method for providing a user interface for an interactive data query, comprising:
   receiving a set of results from a data query system, wherein the set of results is responsive to a combined query based on a field search query for searching raw machine data and location search information designating one or more user-defined boundary regions for searching the raw machine data, and wherein each user-defined boundary region represents a region defined by a user submitting the combined query and not confined to pre-defined boundaries; and
   displaying a visualization of the set of results as a geographic representation, the geographic representation including each user-defined boundary region of the one or more user-defined boundary regions, wherein a characteristic of each user-defined boundary region, within the geographic representation, is modified according to a number of search results, within the set of results, that correspond to the user-defined boundary region, and wherein the modification of the characteristic of each user-defined boundary region indicates a relative difference among the one or more user-defined boundary regions in the number of search results, within the set of search results, that correspond to each user-defined boundary region.

2. The computer-implemented method of claim 1, wherein the characteristic is at least one of color, shading, contrast, or opacity.

3. The computer-implemented method of claim 1, wherein the characteristic of each user-defined boundary region, within the geographic representation, is modified according to the number of search results, within the set of results, that correspond to the user-defined boundary region relative to a number of search results, within the set of results, that do not correspond to the user-defined boundary region.

4. The computer-implemented method of claim 1 further comprising:
receiving a selection of a user-defined boundary region from the geographic representation; and
displaying the results, within the set of results, that correspond to the user-defined boundary region.

5. The computer-implemented method of claim 1, wherein at least one of the one or more user-defined boundary regions is defined by a free-form drawing tool.

6. The computer-implemented method of claim 1 further comprising:
receiving a deselection of a user-defined boundary region of the one or more of user-defined boundary regions; and
removing from the geographic representation results associated with the deselected user-defined boundary region.

7. The computer-implemented method of claim 1 further comprising:
receiving additional results as real-time data; and
updating the characteristic of each user-defined boundary region, within the geographic representation, to reflect the additional results.

8. The computer-implemented method of claim 1 further comprising, while the field search query and the location search information are unchanged:
continuously receiving additional results as real-time data; and
continuously updating the characteristic of each user-defined boundary region, within the geographic representation, to reflect the additional results.

9. The computer-implemented method of claim 1, wherein the visualization is a choropleth.

10. The computer-implemented method of claim 1 further comprising:
obtaining a selection of a time range; and
modifying the visualization to reflect a subset of results, from the set of results, within the time range, wherein modifying the visualization to reflect the subset of result comprises modifying the characteristic of each user-defined boundary region, within the geographic representation, according to a number of search results, within the subset of search results, that correspond to the user-defined boundary region.

11. The computer-implemented method of claim 1 further comprising:
determining the number of search results, within the set of results, that correspond to a first user-defined boundary region of the one or more user-defined boundaries exceeds a threshold; and
providing a notification that the number of results, within the set of results, that correspond to the first user-defined boundary region exceeds the threshold.

12. The computer-implemented method of claim 1, wherein the visualization further includes a visual display of the set of results on a time scale.

13. The computer-implemented method of claim 1, wherein the visualization further includes a visual display of the set of results on a time scale, wherein the time scale depicts subsets of events for each time range of a plurality of time ranges of the time scale as a bar within the time scale.

14. The computer-implemented method of claim 1, wherein the visualization further includes a visual display of the set of results on a time scale, wherein the time scale depicts subsets of events for each time range of a plurality of time ranges of the time scale as a set of stacking color-coded bars, each color-coded bar of the set of stacking color-coded bars corresponding to a user-defined boundary region of the one or more user-defined boundary regions.

15. A system comprising:
a physical data store including instructions executable by a processor; and
a processor configured to execute the instructions to:
receive a set of results from a data query system, wherein the set of results is responsive to a combined query based on a field search query for searching raw machine data and location search information designating a one or more user-defined boundary regions for searching the raw machine data, and wherein each user-defined boundary region represents a region defined by a user submitting the combined query and not confined to pre-defined boundaries; and
display a visualization of the set of results as a geographic representation, the geographic representation including each user-defined boundary region of the one or more user-defined boundary regions, wherein a characteristic of each user-defined boundary region, within the geographic representation, is modified according to a number of search results, within the set of results, that correspond to the user-defined boundary region, and wherein the modification of the characteristic of each user-defined boundary region indicates a relative difference among the one or more user-defined boundary regions in the number of search results, within the set of search results, that correspond to each user-defined boundary region.

16. The system of claim 15 wherein the processor is further configured to execute the instructions, while the field search query and the location search information are unchanged, to:
continuously receiving additional results as real-time data; and
continuously updating the characteristic of each user-defined boundary region, within the geographic representation, to reflect the additional results.

17. The system of claim 15, wherein the visualization further includes a visual display of the set of results on a time scale, wherein the time scale depicts subsets of events for each time range of a plurality of time ranges of the time scale as a set of stacking color-coded bars, each color-coded bar of the set of stacking color-coded bars corresponding to a user-defined boundary region of the plurality of user-defined boundary regions.

18. One or more non-transitory computer-readable media comprising instructions executable by a computing system to:
  receive a set of results from a data query system, wherein the set of results is responsive to a combined query based on a field search query for searching raw machine data and location search information designating a one or more user-defined boundary regions for searching the raw machine data, and wherein each user-defined boundary region represents a region defined by a user submitting the combined query and not confined to pre-defined boundaries; and
  display a visualization of the set of results as a geographic representation, the geographic representation including each user-defined boundary region of the one or more user-defined boundary regions, wherein a characteristic of each user-defined boundary region, within the geographic representation, is modified according to a number of search results, within the set of results, that correspond to the user-defined boundary region, and wherein the modification of the characteristic of each user-defined boundary region indicates a relative difference among the one or more user-defined boundary regions in the number of search results, within the set of search results, that correspond to each user-defined boundary region.

19. The one or more non-transitory computer-readable media of claim 18, wherein the instructions are further executable by a computing system to, while the field search query and the location search information are unchanged:
  continuously receiving additional results as real-time data; and
  continuously updating the characteristic of each user-defined boundary region, within the geographic representation, to reflect the additional results.

20. The one or more non-transitory computer-readable media of claim 18, wherein the visualization further includes a visual display of the set of results on a time scale, wherein the time scale depicts subsets of events for each time range of a plurality of time ranges of the time scale as a set of stacking color-coded bars, each color-coded bar of the set of stacking color-coded bars corresponding to a user-defined boundary region of the one or more user-defined boundary regions.

\* \* \* \* \*